US007289084B2

(12) United States Patent
Lesniak

(10) Patent No.: US 7,289,084 B2
(45) Date of Patent: Oct. 30, 2007

(54) COMPUTER DISPLAY APPARATUS

(76) Inventor: John Michael Lesniak, 47 West Division, #184, Chicago, IL (US) 60610

( * ) Notice: Subject to any disclaimer, the term of this patent is extended or adjusted under 35 U.S.C. 154(b) by 228 days.

(21) Appl. No.: 11/063,001

(22) Filed: Feb. 22, 2005

(65) Prior Publication Data

US 2006/0187142 A1     Aug. 24, 2006

(51) Int. Cl.
G09G 5/00 (2006.01)
G06F 15/02 (2006.01)
G06F 3/033 (2006.01)
(52) U.S. Cl. .................. 345/1.1; 345/204; 345/533; 345/619; 367/68
(58) Field of Classification Search .............. 345/1.1, 345/1.2, 5, 28, 63, 169, 173, 204, 581, 589, 345/619, 519–522, 531, 533, 536, 541, 564–565, 345/574; 715/718; 367/68; 348/323.12
See application file for complete search history.

(56) References Cited

U.S. PATENT DOCUMENTS

| 4,159,417 | A | 6/1979 | Rubincam | 235/375 |
|---|---|---|---|---|
| 4,463,372 | A | 7/1984 | Bennett et al. | 358/22 |
| 4,545,023 | A | 10/1985 | Mizzi | 364/709 |
| 4,602,285 | A | 7/1986 | Beaulier et al. | 358/160 |
| 4,631,596 | A | 12/1986 | Yaguchi | 358/256 |
| 4,675,182 | A | 6/1987 | Streuff et al. | 235/436 |
| 4,689,681 | A | 8/1987 | Jackson | 358/183 |
| 4,700,840 | A | 10/1987 | Haddock | 206/449 |
| 4,746,981 | A | 5/1988 | Nadan et al. | 358/160 |
| 4,820,167 | A | 4/1989 | Nobles et al. | 434/336 |
| 4,855,725 | A | 8/1989 | Fernandez | 340/706 |
| 4,876,657 | A | 10/1989 | Saito et al. | 364/521 |
| 4,884,068 | A | 11/1989 | Matheny et al. | 340/707 |
| 4,917,292 | A | 4/1990 | Drexler | 325/488 |
| 4,951,040 | A | 8/1990 | McNeil et al. | 340/729 |
| 4,985,697 | A | 1/1991 | Boulton | 340/750 |
| 4,985,848 | A | 1/1991 | Pfeiffer et al. | 364/518 |
| 5,012,229 | A | 4/1991 | Lennon et al. | 340/706 |
| 5,021,989 | A | 6/1991 | Fujisawa et al. | 364/900 |
| 5,049,862 | A | 9/1991 | Dao et al. | 340/706 |
| 5,109,348 | A | 4/1992 | Pfeiffer et al. | 395/164 |

(Continued)

OTHER PUBLICATIONS

"Video Engineering", Arch Luther and Andrew Inglis, McGraw-Hill Video/Audio Professional, Third Edition, © 1999, pp. 351-367.

Primary Examiner—Wesner Sajous
(74) Attorney, Agent, or Firm—Marshall Gerstein & Borun LLP

(57) ABSTRACT

A computer display apparatus includes first and second display units operatively coupled to a display controller. The display controller receives imaging instructions for images and display mode instructions for displaying the images, and causes the display units to independently generate images from the imaging instructions according to the display mode instructions. The display controller may include a display processor programmed to generate pixel data according to the imaging instructions, and first and second refresh outputs programmed to independently generate image displays from the manipulated pixel data on the first and second display units in first and second display modes, respectively. A display re-mapper may manipulate the pixel data according to display mode instructions. A display memory fetcher may manipulate pixel data according to display mode instructions in response to a request for pixel data from the first and second refresh outputs independently.

20 Claims, 14 Drawing Sheets

U.S. PATENT DOCUMENTS

| | | | |
|---|---|---|---|
| 5,128,662 A | 7/1992 | Failla | 340/752 |
| 5,146,592 A | 9/1992 | Pfeiffer et al. | 395/157 |
| 5,157,737 A | 10/1992 | Sklarew | 382/315 |
| 5,233,333 A | 8/1993 | Borsuk | 340/731 |
| 5,239,665 A | 8/1993 | Tsuchiya | 395/800 |
| 5,256,067 A | 10/1993 | Gildea et al. | 434/169 |
| 5,263,135 A | 11/1993 | Dei | 395/163 |
| 5,297,216 A | 3/1994 | Sklarew | 382/13 |
| 5,339,091 A | 8/1994 | Yamazaki et al. | 345/104 |
| 5,341,229 A | 8/1994 | Rowan | 359/10 |
| 5,365,598 A | 11/1994 | Sklarew | 382/13 |
| 5,374,940 A | 12/1994 | Corio | 345/1 |
| 5,379,057 A | 1/1995 | Clough et al. | 345/1 |
| 5,438,662 A | 8/1995 | Randall | 395/161 |
| 5,448,301 A | 9/1995 | Michener | 348/578 |
| 5,467,102 A | 11/1995 | Kuno et al. | 345/1 |
| 5,475,398 A | 12/1995 | Yamazaki et al. | 345/104 |
| 5,475,399 A | 12/1995 | Borsuk | 345/130 |
| 5,502,463 A | 3/1996 | Sasaki et al. | 345/204 |
| 5,534,888 A | 7/1996 | Lebby et al. | 345/121 |
| 5,566,098 A | 10/1996 | Lucente et al. | 364/708.1 |
| 5,594,471 A | 1/1997 | Deeran et al. | 345/173 |
| 5,636,101 A | 6/1997 | Bonsall et al. | 361/681 |
| 5,640,552 A | 6/1997 | Yianilos | 395/605 |
| 5,652,606 A | 7/1997 | Sasaki et al. | 345/204 |
| 5,661,635 A | 8/1997 | Huffman et al. | 361/684 |
| 5,663,748 A | 9/1997 | Huffman et al. | 345/173 |
| 5,675,362 A | 10/1997 | Clough et al. | 345/173 |
| 5,689,648 A | 11/1997 | Diaz et al. | 395/226 |
| 5,697,793 A | 12/1997 | Huffman et al. | 434/317 |
| 5,703,624 A | 12/1997 | van Kruistum | 345/169 |
| 5,734,891 A | 3/1998 | Saigh | 395/610 |
| 5,742,353 A | 4/1998 | Yasuki et al. | 348/578 |
| 5,761,485 A | 6/1998 | Munyan | 395/500 |
| 5,761,681 A | 6/1998 | Huffman et al. | 707/500 |
| 5,761,682 A | 6/1998 | Huffman et al. | 707/500 |
| 5,774,109 A | 6/1998 | Winksy et al. | 345/124 |
| 5,805,118 A | 9/1998 | Mishra et al. | 345/1 |
| 5,815,407 A | 9/1998 | Huffman et al. | 364/492 |
| 5,825,613 A | 10/1998 | Holden | 361/681 |
| 5,847,698 A | 12/1998 | Reavey et al. | 345/173 |
| 5,855,001 A | 12/1998 | Doederlein et al. | 704/270 |
| D404,761 S | 1/1999 | Tarpenning et al. | D19/26 |
| 5,855,483 A | 1/1999 | Collins et al. | 434/322 |
| 5,893,132 A | 4/1999 | Huffman et al. | 707/532 |
| 5,900,848 A | 5/1999 | Haneda et al. | 345/1 |
| 5,914,706 A | 6/1999 | Kono | 345/173 |
| 5,914,707 A | 6/1999 | Kono | 345/173 |
| 5,920,058 A | 7/1999 | Weber et al. | 235/457 |
| 5,926,237 A | 7/1999 | Yun et al. | 349/58 |
| 5,933,526 A | 8/1999 | Sklarew | 382/189 |
| 5,949,408 A | 9/1999 | Kang et al. | 345/169 |
| 5,953,000 A | 9/1999 | Weirich | 345/173 |
| 5,956,034 A | 9/1999 | Sachs et al. | 345/350 |
| 5,956,048 A | 9/1999 | Gaston | 345/507 |
| 5,975,910 A | 11/1999 | Sims-Barnes | 434/178 |
| 5,991,594 A | 11/1999 | Froeber et al. | 434/317 |
| 6,002,799 A | 12/1999 | Sklarew | 382/189 |
| 6,011,545 A | 1/2000 | Henderson et al. | 345/173 |
| 6,018,340 A | 1/2000 | Butler et al. | 345/339 |
| 6,020,942 A | 2/2000 | Yun et al. | 349/58 |
| 6,029,214 A | 2/2000 | Dorfman et al. | 710/73 |
| 6,144,358 A * | 11/2000 | Narayanaswamy et al. | 345/102 |
| 6,317,108 B1 * | 11/2001 | Kalt | 345/85 |
| 6,327,482 B1 * | 12/2001 | Miyashita | 455/566 |
| 6,628,244 B1 * | 9/2003 | Hirosawa et al. | 345/2.3 |
| 2003/0227423 A1 * | 12/2003 | Arai et al. | 345/1.1 |

* cited by examiner

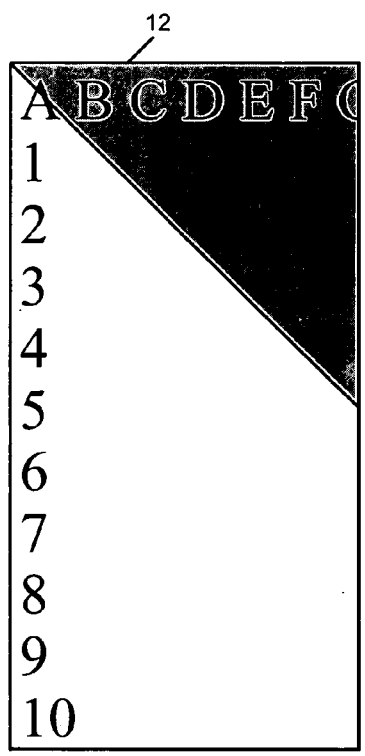
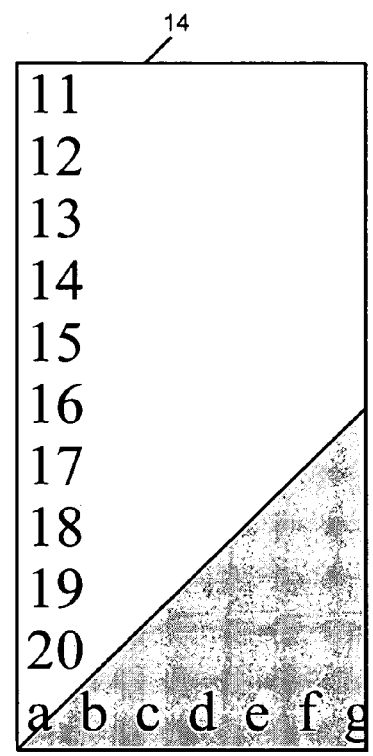
FIG. 10
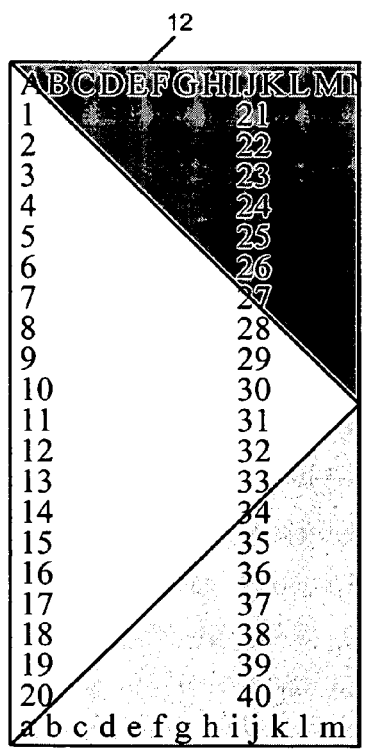
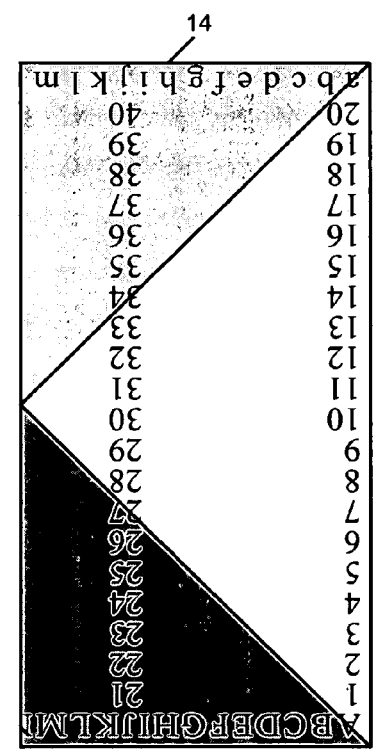
FIG. 11

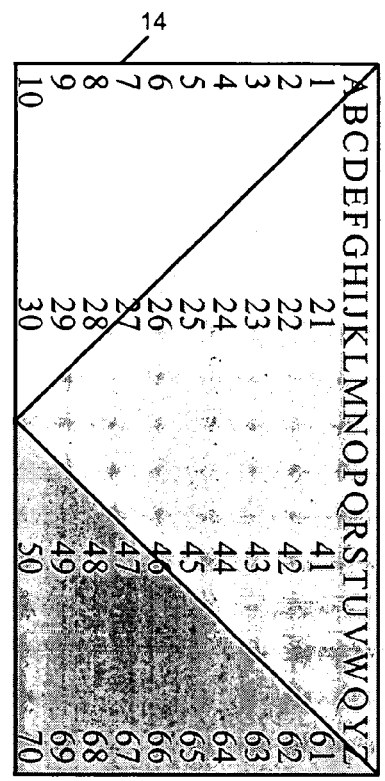
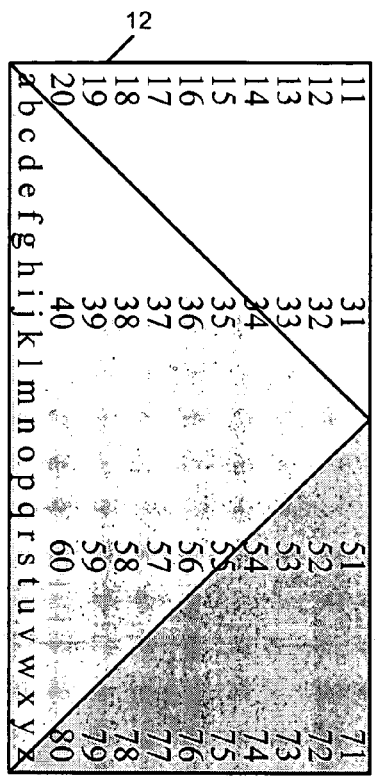
FIG. 12
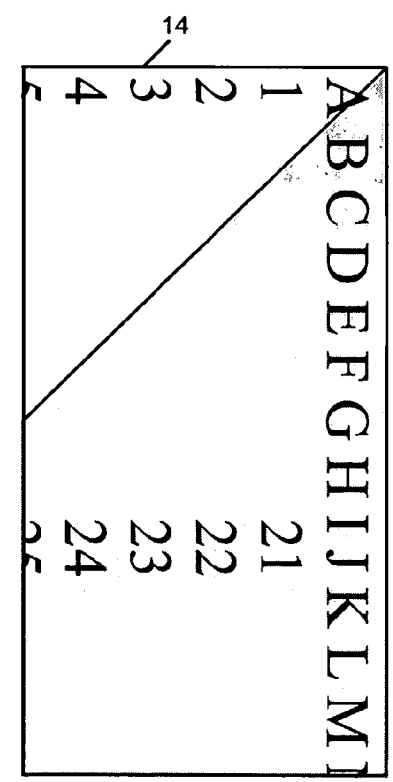
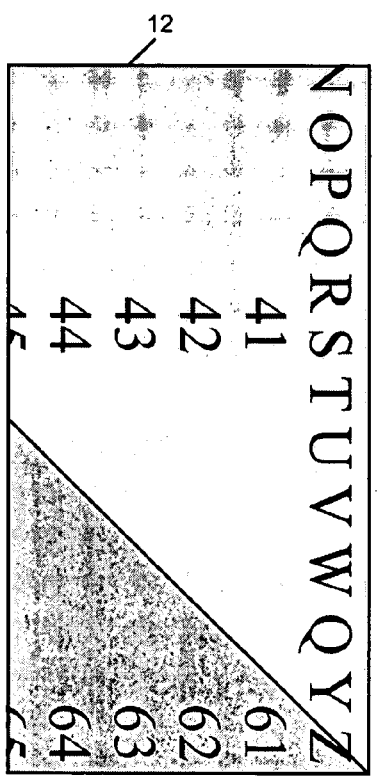
FIG. 13

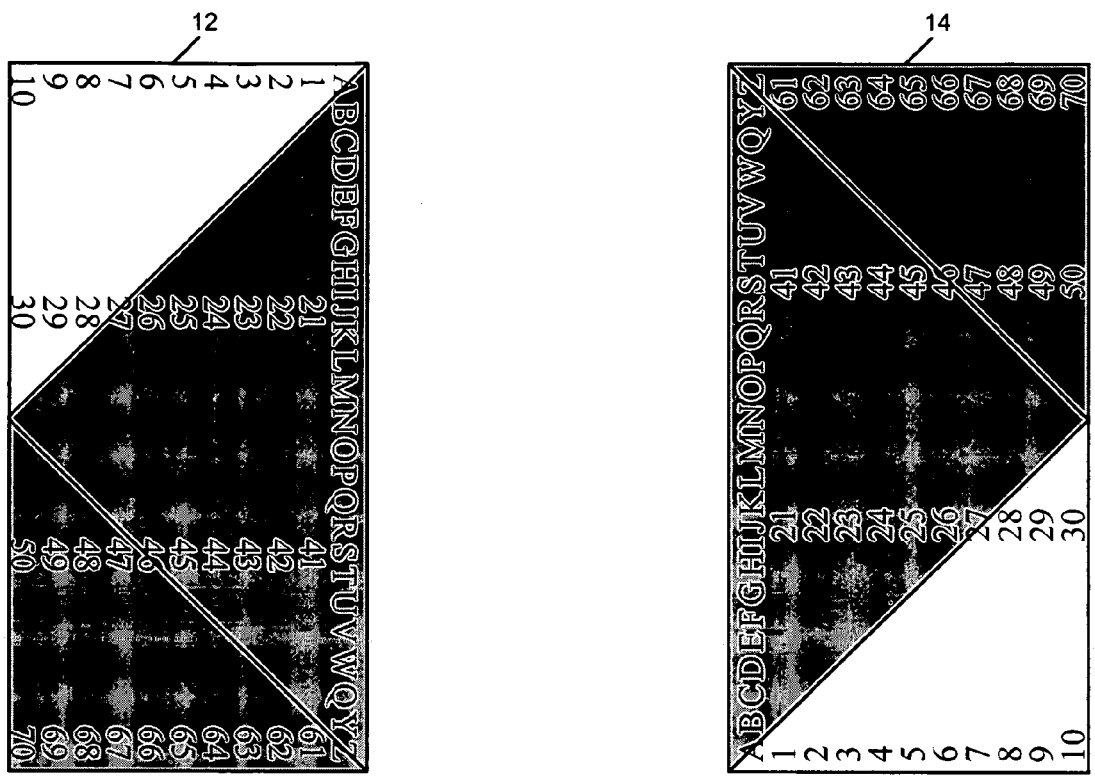
FIG. 14
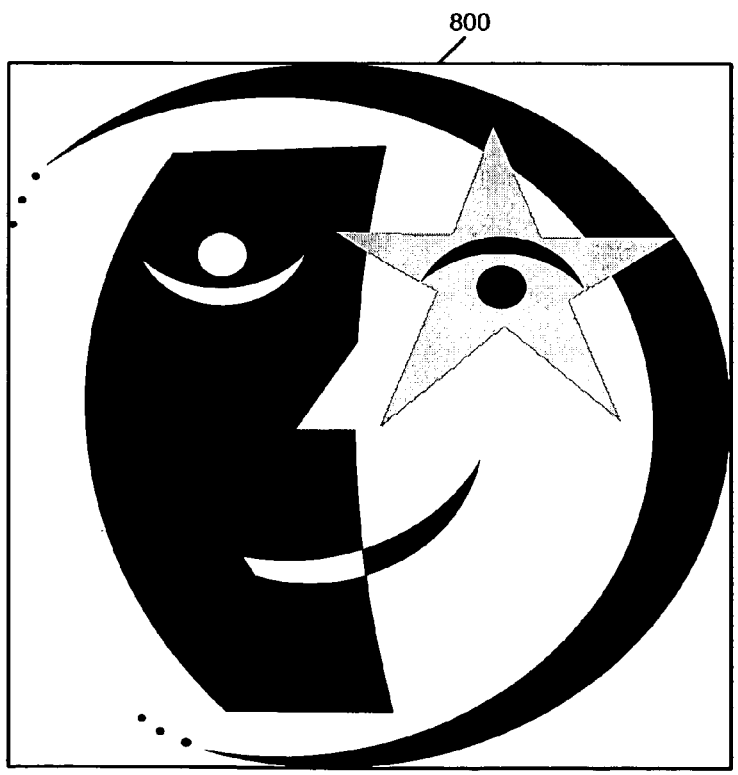

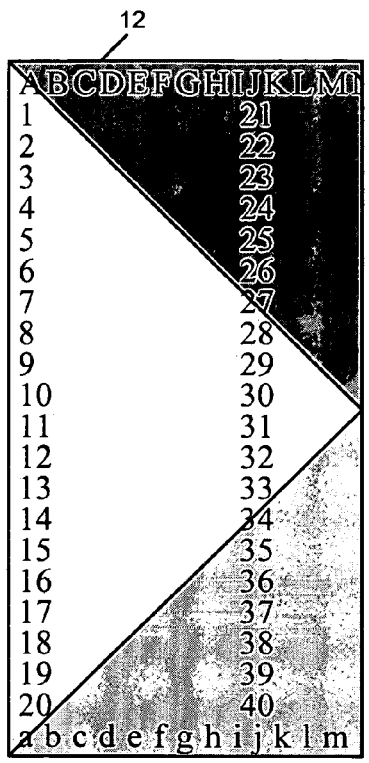
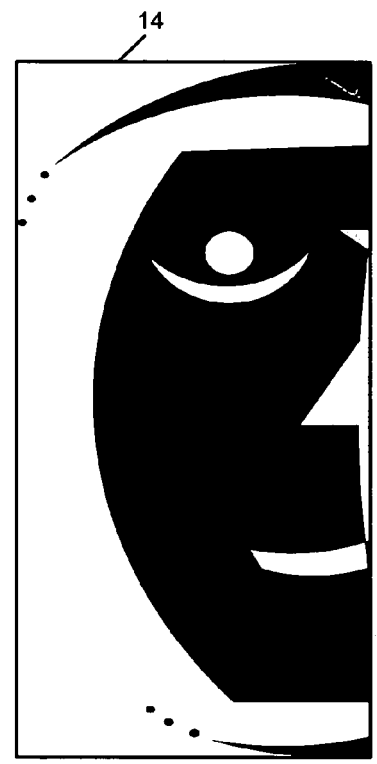
FIG. 16
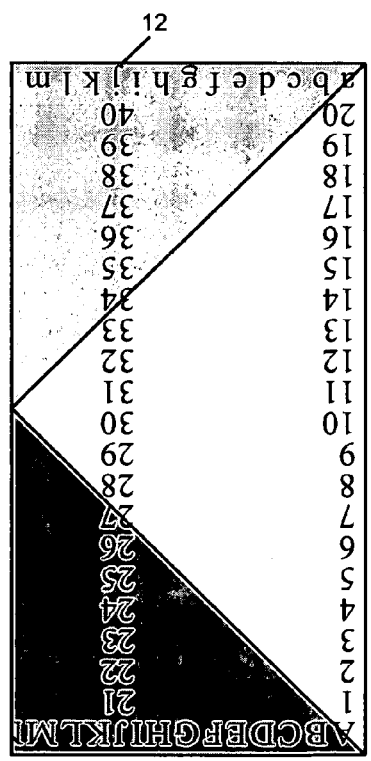
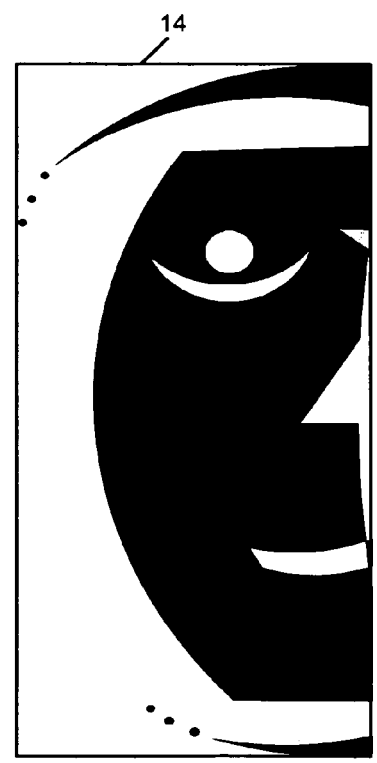
FIG. 17

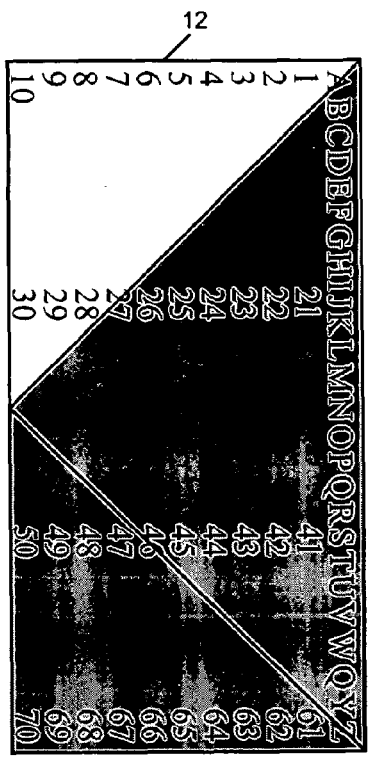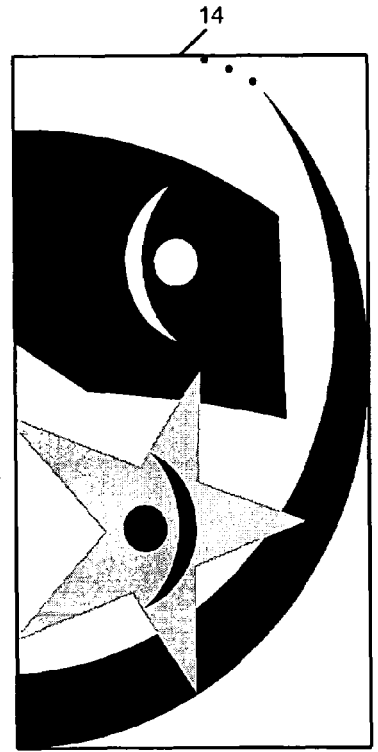
FIG. 18
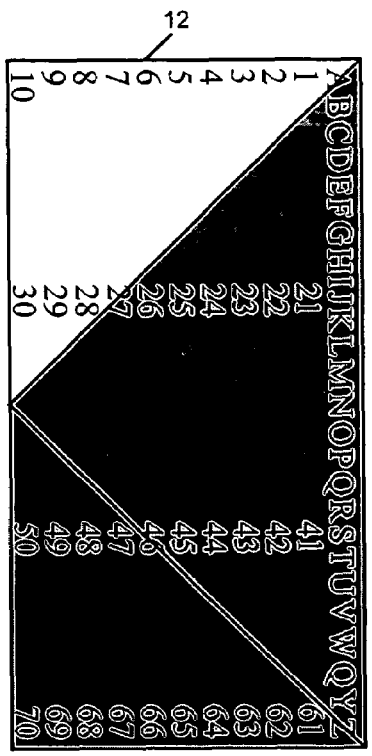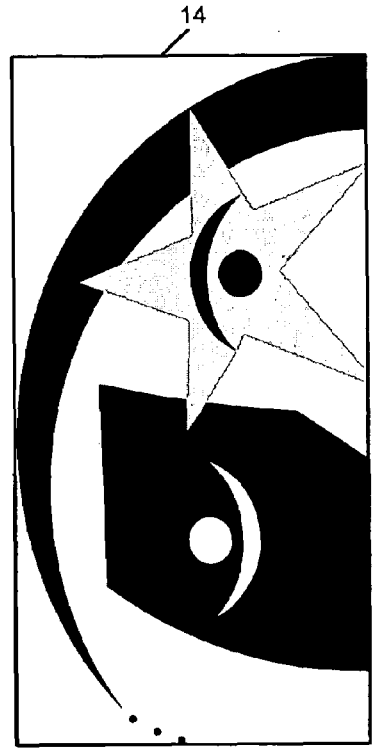
FIG. 19

COMPUTER DISPLAY APPARATUS

FIELD OF TECHNOLOGY

This patent relates generally to computer display devices and, more particularly, to a portable, multiple display computer display device.

BACKGROUND

With the advent of more powerful portable computing devices, and the growth of electronic distribution of information, there is a continued desire to present such information in a convenient and familiar format that is portable and similar to traditional mediums such as paper-based books. For example, news articles, technical publications, essays, books, and other textual and graphical information are widely circulated on the internet in various digital formats. Devices capable of displaying such information have included desktop computers, laptop computers, handheld personal digital assistants (PDAs), and electronic tablets. Within such devices, display systems have included cathode ray tube (CRT) displays or flat-panel matrix displays, such as liquid crystal displays (LCD) and plasma displays, which were coupled to a video driver device. Some of these display systems have been touch-sensitive, portable and capable of displaying various image types (e.g., text, static graphics, video, etc.). However, these devices do not lend themselves to the familiar look, feel and comfort that many people associate with a book or similar non-electronic device partly because only a single display screen is generally used.

Multiple display systems have also existed. One example being airport flight information systems, which repeat the same image on multiple, geographically dispersed display devices. Another example being desktop computers employing multiple displays for expanding the available screen space. However, these devices are not portable, do not lend themselves to the familiar look, feel and comfort associated with a book or similar device, and do not provide flexibility in the range of possible uses of multiple displays devices for displaying images.

Portable computing devices have been developed, such as PDAs, which employ a single flat-panel display, and electronic books, which employ two flat-panel displays situated next to each other. While these devices provided some functionality, look and feel associated with a book, they do not provide flexibility in the range of possible uses for such a portable, microprocessor-based device. For instance, such devices were generally embedded systems that did not permit customization or versatility, particularly in regards to the display of images on the displays. One aspect of this inflexibility is that orientation of an image on a display could not be easily changed or altered.

Devices with single or multiple displays have used distinct display controllers for each display. Generally, a display controller included an input/output interface, random access memory, a processor, logic circuitry, and a display driver. The input/output interface managed communications between the display controller and the larger computing device. Random access memory stored pixel data, which includes individual pixel address and pixel color data, for the image to display. A processor (e.g., a display processor) has also been used to relieve a main processor (e.g., a central processing unit) in the larger computing device of computing changes to the pixel data. Logic circuitry has been used to retrieve pixel data from the random access memory and to forward pixel data to the display driver. And the display driver has been used to control a display device, which displays the visible image. The display driver, or refresh output, generally updated the display in a line-by-line technique referred to as a "scan mode". In order to accommodate multiple displays to display distinct images, it was common to employ a separate display controller for each display. Each display controller had separate memory storage, a separate display processor, separate input/output interfaces, etc. In this configuration, the operating software and main processor were burdened to determine which display among the multiple displays should display each pixel image.

SUMMARY

A computer display apparatus may include a first display unit and a second display unit articulately coupled to the first display unit. A display controller may be operatively coupled to the first and second display units. The display controller may include a display processor and memory. The display controller may be programmed to receive imaging instructions for one or more images, to receive display mode instructions for displaying the one or more images, to cause the first display unit to generate a first image from the imaging instructions according to the display mode instructions, and to cause the second display unit to generate a second image from the imaging instructions according to the display mode instructions independent of the generation of the first image.

A display controller may include a display processor programmed to generate pixel data according to imaging instructions, a display re-mapper operatively coupled to the display processor and programmed to manipulate the pixel data according to display mode instructions, and first and second refresh outputs operatively coupled to the display re-mapper. The first refresh output may be programmed to generate an image display from at least part of the manipulated pixel data on the first display unit in a first display mode. The second refresh output may be programmed to generate an image display from at least part of the manipulate pixel data on the second display unit in a second display mode. The image displayed on the first display unit may be displayed in a display mode independent of the display mode of the image displayed on the second display unit.

A display controller may include a display processor programmed to generate pixel data according to imaging instructions, first and second refresh outputs programmed to request pixel data, and a display memory fetcher operatively coupled to the display processor and the first and second refresh outputs. The display memory fetcher may be programmed to manipulate pixel data according to display mode instructions in response to a request for pixel data from at least one of the first and second refresh outputs. The requesting refresh output may be programmed to generate an image display on a display unit from the manipulated pixel data in accordance with display mode instructions. An image displayed on the first display unit may be displayed in a display mode independent of the display mode of the image displayed on the second display unit.

BRIEF DESCRIPTION OF THE DRAWINGS

Figures 8, 9:
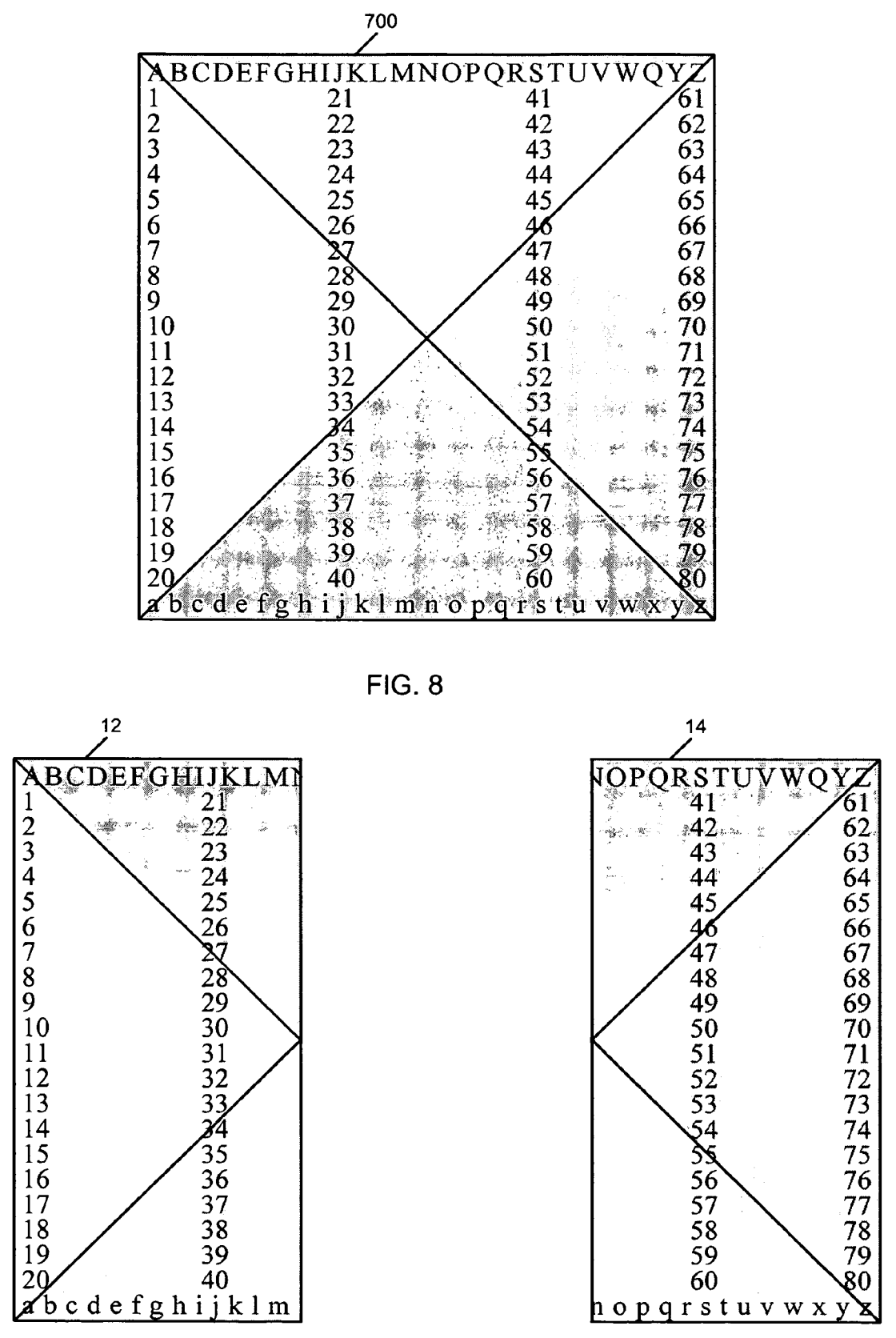

FIG. 8 is an example of an image that may be displayed in various display modes on the computer display apparatus;

FIG. 9 is an example of display modes displaying the image of FIG. 8 on the computer display apparatus;

FIG. 10 is an example of alternative display modes displaying the image of FIG. 8 on the computer display apparatus;

FIG. 11 is an example of other alternative display modes displaying the image of FIG. 8 on the computer display apparatus;

FIG. 12 is an example of more alternative display modes displaying the image of FIG. 8 on the computer display apparatus;

FIG. 13 is an example of further alternative display modes displaying the image of FIG. 8 on the computer display apparatus;

FIG. 14 is an example of still further alternative display modes displaying the image of FIG. 8 on the computer display apparatus;

FIG. 15 is an example of a second image that may be displayed in various display modes on the computer display apparatus with the image of FIG. 8;

FIG. 16 is an example of display modes displaying the images of FIGS. 8 and 15 on the computer display apparatus;

FIG. 17 is an example of alternative display modes displaying the images of FIGS. 8 and 15 on the computer display apparatus;

FIG. 18 is an example of other alternative display modes displaying the images of FIGS. 8 and 15 on the computer display apparatus; and FIG. 19 is an example of more alternative display modes displaying the images of FIGS. 8 and 15 on the computer display apparatus.

DETAILED DESCRIPTION

Figure 1:
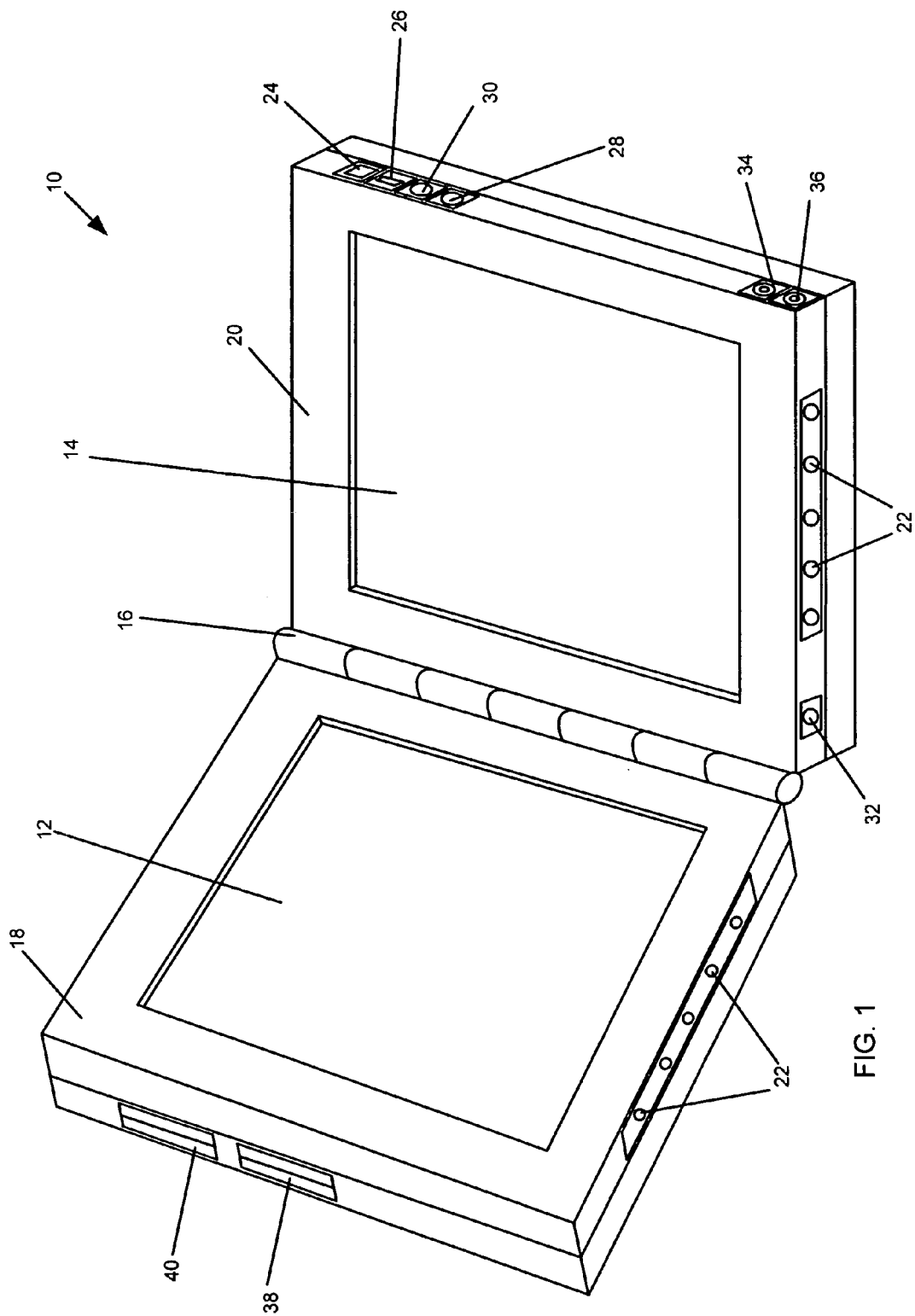
FIG. 1 is a perspective view of an example of a computer display apparatus.

An example of a computer display apparatus 10 is shown generally in FIG. 1. Although the computer display apparatus 10 is particularly well suited for portable personal computing, or the like, persons of ordinary skill in the art will readily appreciate that the teachings of the instant invention are not limited to any particular type of portable computer. On the contrary, the teachings of the invention can be employed with virtually any computer display apparatus where independent transformation or manipulation of images on multiple display units is desired. Thus, although the computer display apparatus 10 will be described below primarily in relation to a portable personal computer display apparatus, the apparatus could likewise be used for a variety of uses, including mobile computing devices, electronic books, public displays, mobile telephones, etc.

Generally, the computer display apparatus 10 includes a first display unit 12 and a second display unit 14 articulately coupled. In the illustrated example, the display units 12, 14 are generally symmetrical (i.e., of the same size and shape), although the proportions of each display unit 12, 14 may differ depending on the desired use. In one example, the proportions are approximately the same shape and size of a page of an average book, thereby providing the computer display apparatus 10 with an overall appearance and feel similar to that of a book. Whereas in another example, the proportions of each display unit 12, 14 together give the appearance of a square. In yet another example, the proportions of each display unit 12, 14 are comparable to those of a standard computer screen which may range from approximately 13 inches diagonally to 29 inches or more diagonally. The proportions of the display units 12, 14 may depend on the particular application of the computer display apparatus 10. Although only two display units 12, 14 are shown in the illustrated example, various combinations of multiple display units may be used.

Each display unit 12, 14 is generally a flat-panel video display screen which may comprise various technologies, including plasma display panels (PDPs), liquid crystal displays (LCDs), liquid crystal on silicon (LCOS), light emitting diodes (LEDs), ferroelectric LCDs, field emissions displays (FEDs), electroluminescent displays (ELDs), and microelectromechanical (MEM) devices such as digital micromirror devices (DMDs) or grating light valves (GLVs). Each display unit 12, 14 may further include organic display technologies such as organic electoluminescence (OEL) and organic light emitting diodes (OLEDs), as well as light emitting polymers. One or both of the display units 12, 14 may be a touch-sensitive display, and each may have independent controls for contrast and brightness either as a menu selection displayed on the display unit 12, 14 or as mechanical controls (e.g., thumb wheels, buttons, etc.) provided on the computer display apparatus 10.

The display units 12, 14 are articulately coupled to one another via a hinge 16 or other articulated joint that holds the display units 12, 14 together, but allows each display unit 12, 14 to swing relative to the other. Although the illustrated example discloses a pin and channel hinge assembly 16, various other hinges or articulated joints may likewise be used. The placement of the hinge 16 or articulated joint may depend on the desired application of the computer display apparatus 10. In the illustrated example, the hinge 16 allows one display unit 12 to be opened and closed within a range of approximately 0 to 180 degrees with respect to the other display unit 14. This allows the computer display apparatus 10 to be opened and closed similar to a book. However, the hinge 16 may be positioned on the lower edge of the display units 12, 14 allowing the display units 12, 14 to be articulated between approximately 180 and 360 degrees as compared to FIG. 1. When positioned at 360 degrees, the display units 12, 14 face away from each other to allow viewing on either side of the computer display apparatus 10. In still another example, the hinge 16 or articulated joint allows the display units 12, 14 to be articulated between approximately 0 degrees and 360 degrees. The hinge 16 or articulated joint may be of sufficient rigidity to maintain a particular angle without additional support or locking mechanisms, though a support or locking mechanisms (e.g., interlocking disks, grooves, locking screws, etc.) may be included to adjust and hold the display units 12, 14 in predetermined positions and angles. A sensor may be used to detect the relative angle between the display units 12, 14, and the display mode of the display units 12, 14 may be automatically adjusted accordingly. Various methods and apparatus for detecting the angle between two articulated objects are well known by those of ordinary skill in the art.

The computer display apparatus 10 further includes a housing having a first housing portion 18 and a second housing portion 20, which may be articulately connected to each other via the hinge 16 or other articulated joint. The first housing portion 18 contains one display unit 12 and the second housing portion contains the other display unit 14. If touch-sensitive display units are used, the housing may incorporate a channel or recess to house a stylus. The housing may house various electronics associated with the computer display apparatus 10, including an operating controller, a display controller, a sound circuit, communication interfaces, I/O ports, power supplies, etc.

The computer display apparatus 10 also includes one or more general purpose dynamic buttons 22. The function of the dynamic buttons 22 may depend on the particular program or operating system being executed by the computer display apparatus 10, and may also depend on the particular display mode of the computer display apparatus 10. Generally, when a program or operating system is loaded onto the computer display apparatus 10, the program or operating system may automatically search for and find the dynamic buttons 22 and assign each button 22 a specific function in relation to the program or operating system. Alternatively or in conjunction, the dynamic buttons 22 may be assigned a specific function by the user. The dynamic buttons 22 may also be used to select and control the display mode of each display unit 12, 14, independently of a program or operating system being executed by the computer display apparatus 10.

Various connections, input/output (I/O) ports and interfaces may be used to communicatively couple the computer display apparatus 10 to various external devices such as external memory devices (e.g., hard drive, DVD/CD drive, solid-state memory devices, etc.), a keyboard, a mouse, a printer, a network (intranet or internet), audio/visual devices, etc. The connections may include one or more of the following: an Ethernet connection 24, a Universal Serial Bus (USB) connection 26, a serial connection 28, a Personal System 2 (PS2) connection 30, an infrared connection 32, a parallel connection, video connections (e.g., S-video, firewire, etc.), audio connections such as a microphone jack 34 and a headphone/speaker jack 36, printer connections, etc. Although the computer display apparatus 10 may include internal memory and an internal wireless communication device, Personal Computer Memory Card International Association (PCMCIA) I/O slots 38, 40 may also be used to accommodate a wireless network interface card or memory card. Other PCMCLI compatible devices, such as other network interfaces and digital cameras, may likewise be used with the computer display apparatus 10.

Figure 2:
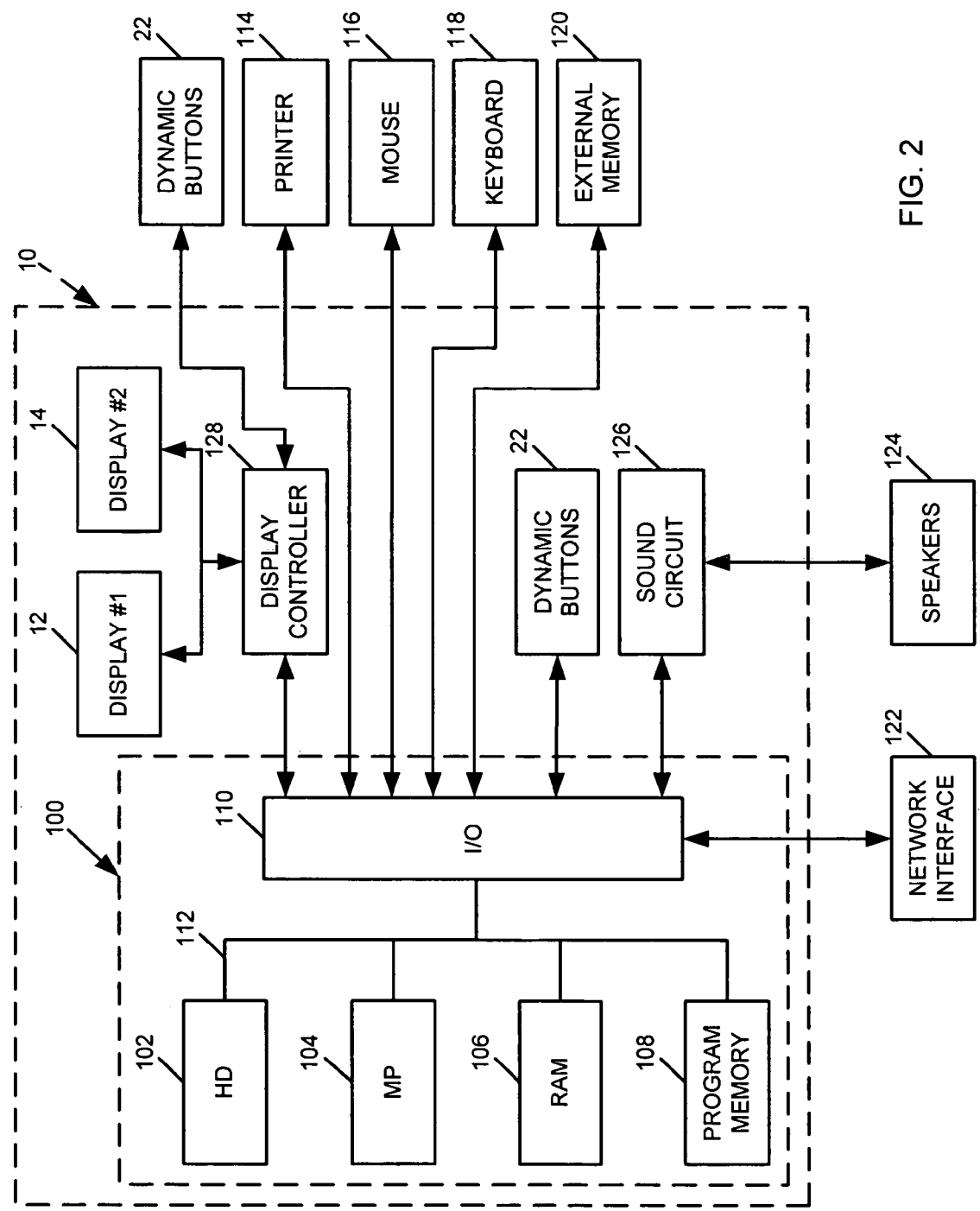
FIG. 2 is a block diagram of examples of electrical components for the computer display apparatus.

FIG. 2 is a block diagram of the computer display apparatus 10 showing a number of components that may be incorporated in the computer display apparatus 10. Referring to FIG. 2, the computer display apparatus 10 may include an operating controller 100 that may comprise a hard drive 102, a microcontroller or microprocessor (MP) 104, a random-access memory (RAM) 106, a program memory 108 and an input/output (I/O) circuit 110, all of which may be interconnected via an address/data bus 112. It should be appreciated that although only one microprocessor 104 is shown, the operating controller 100 may include multiple microprocessors 104. Similarly, the memory of the operating controller 100 may include multiple RAMs 106 and multiple program memories 108. Although the I/O circuit 110 is shown as a single block, it should be appreciated that the I/O circuit 110 may include a number of different types of I/O circuits. The RAM(s) 104 and program memories 108 may be implemented as semiconductor memories, magnetically readable memories, and/or optically readable memories, for example. The hard drive 102 may be implemented as a solid-state memory device, a magnetic drive or an optical drive, for example.

Although the program memory 108 is shown in FIG. 2 as a read-only memory (ROM) 108 or basic input-output system (BIOS) chip, the program memory of the operating controller 100 may be a read/write or alterable memory, such as a hard disk or solid-state hard drive. In the event a hard drive is used as a program memory 108, the address/data bus 112 shown schematically in FIG. 2 may comprise multiple address/data buses, which may be of different types, and there may be an I/O circuit disposed between the address/data buses. The program memory 108 loads various operating systems and/or software applications onto the computer display device 10, which may be loaded from external sources or from an internal memory such as the hard drive 102.

FIG. 2 illustrates that the dynamic buttons 22, a printer 114, a mouse 116, a keyboard 118, an external memory 120 and a network interface 122 (e.g., wireless, Ethernet, infrared, etc.) are operatively coupled to the I/O circuit 110, each of those components being so coupled by either a unidirectional or bidirectional, single-line or multiple-line data link, which may depend on the design of the component that is used. Speaker(s) 124 may be operatively coupled to a sound circuit 126, that may comprise a voice- and sound-synthesis circuit or that may comprise a driver circuit. The sound-generating circuit 126 is coupled to the I/O circuit 110. The display units 12, 14 are operatively coupled to a display controller 128, which is coupled to the I/O circuit 110.

The display controller 128 receives display or image data and provides images on each display unit 12, 14 independently in various display modes. That is, the same display controller 128 may be used to independently control and transform images on multiple display units 12, 14 by separating pixel data into multiple portions, with one portion displayed on the first display unit 12 and another portion displayed on the second display unit 14 using separate display branches. The display controller 128 is further able to receive image data from multiple image data sources, and display and transform each image independently on each display unit 12, 14. The image data may include both instructions or tasks (i.e., imaging instructions) for creating pixel data (e.g., pixel address data and color data) and instructions for displaying the pixel data in a particular display mode (i.e., display mode instructions). The imaging instructions and the display mode instructions may be derived from the same source or different sources. For example, the imaging instructions may be from an external data source (e.g., external memory, network data, etc.), whereas the display mode instructions may be determined by an application being executed by the operating controller 100, determined by a user(s) based on a button or menu selection, automatically determined by the operating controller 100 or display controller 128, determined based on the position of the display units 12, 14, etc. Alternatively, the display mode instructions may be embedded within the imaging instructions. Based on the image data, the display controller 128 may create pixel data to display an image on one display unit 12 independently of the image displayed on the other display unit 14. Each image may be further transformed independently of the other image based on the display mode instructions (e.g., adjusting size, contrast, brightness, orientation, magnification, colors, etc.).

Because the display controller 128 is able to receive, transform and display images for multiple display units 12, 14, the operating controller 100 is relieved of having to determine which display unit should receive specific image data elements or to compute pixel data according to display mode instructions. The display controller 128 appears to the operating system as a single display controller. Additionally, the display controller 128 may operate each of the display units 12, 14 in display modes independent of the other display unit(s) and independently from the operating system. As such, an operating system being run by the operating controller 100 does not have to be modified to control images on multiple display units, and the operating system is unaffected by transforming the images. The operating system and operating controller 100 may simply be left with the task of driving image data to the display controller 128. This may allow a user to easily and conveniently install, uninstall, change or modify different operating systems on the operating controller 100 without requiring modifications to the operating system to accommodate the multiple display units 12, 14. All or part of the display controller 128 and its functions may be implemented as hardware, software or firmware, though preferably operations of the display controller 128 are implemented as software on a form of memory (e.g., hard drive, solid-state memory, optical memory, magnetic memory, etc.). The operations of the display controller 128 may further be implemented in one or more routines, such as those described below, for receiving, transforming and displaying images independently on the display units 12, 14.

As shown in FIG. 2, the components 22, 114, 116, 118, 120, 122, 126 and 128 may be operatively coupled to the I/O circuit 108 via a respective direct line or conductor. Different connection schemes could be used. For example, one or more of the components shown in FIG. 2 may be operatively coupled to the I/O circuit 110 via a common bus or other data link that is shared by a number of components. Furthermore, some of the components may be directly coupled to the microprocessor 104 without passing through the I/O circuit 110. One or more of the dynamic buttons 22 may be directly coupled to the display controller 128.

Figure 3:
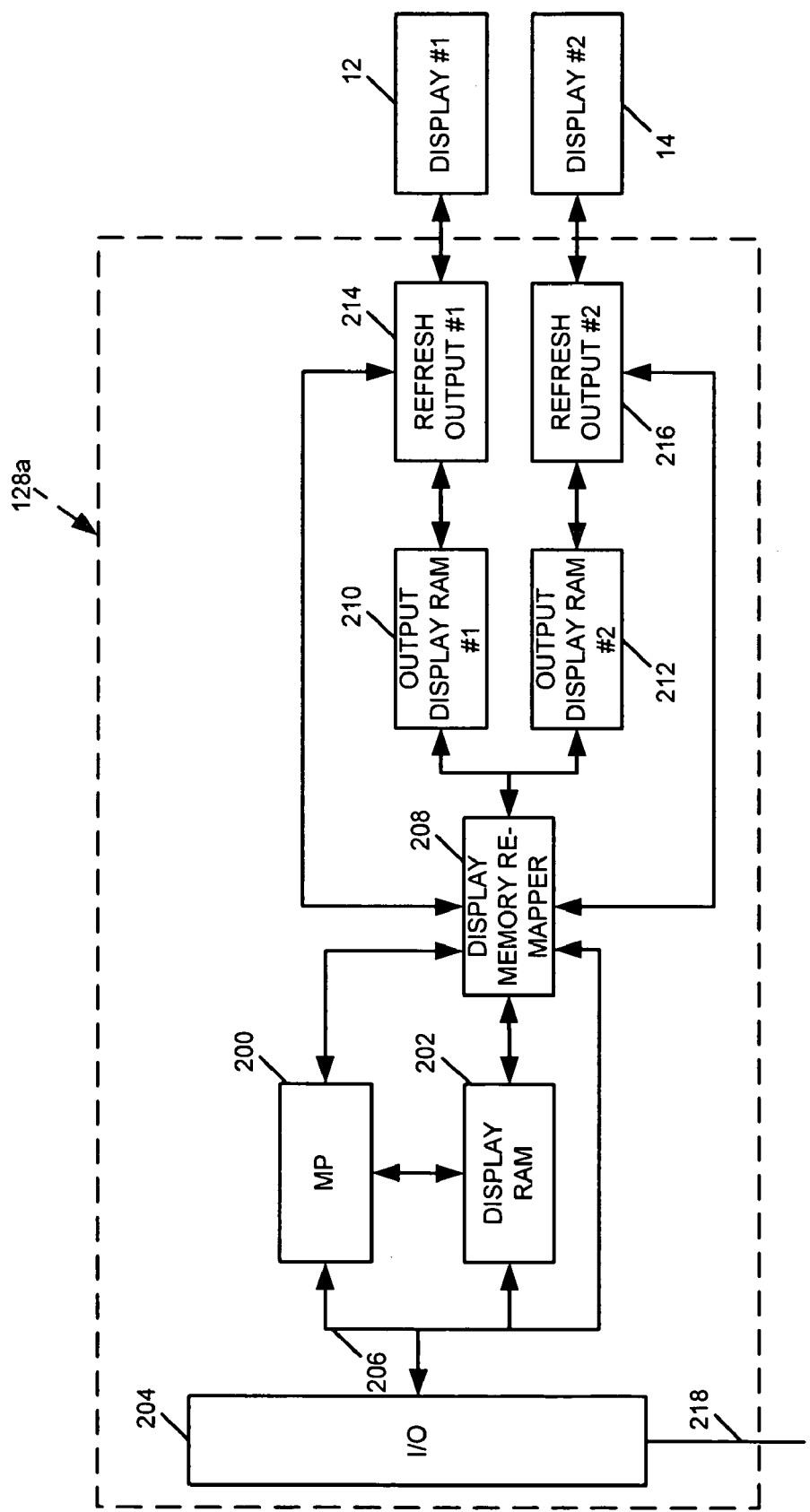
FIG. 3 is a block diagram of an example of a display controller of the computer display apparatus.

FIG. 3 is a block diagram of an example of a display controller 128a that may be used with the computer display apparatus 10. Referring to FIG. 3, the display controller 128a may comprise a display processor 200, such as a graphics acceleration microcontroller or graphics acceleration microprocessor, a display memory 202 and a display input/output (I/O) circuit 204, all of which are operatively intercoupled via an address/data bus 206. A display memory re-mapper 208 is operatively coupled to the display memory 202, with first and second output display memories 210, 212 operatively coupled to the display re-mapper 208. The display memory re-mapper 208 may further be coupled to the I/O circuit 218 via bus 206 to allow the display memory re-mapper 208 to also receive display mode instructions from the operating controller 100 (e.g. the microprocessor 104, the operating system, the system BIOS, etc.) or from the dynamic buttons 22. The display memory re-mapper 208 may also be coupled to the display processor 200 to receive display mode instructions. First and second refresh outputs 214, 216 (e.g., display drivers) are operatively coupled to the first and second output display memories, respectively. The first and second display units 12, 14 are, in turn, operatively coupled to the first and second refresh outputs 214, 216, respectively. The display memory re-mapper 208 may be directly and operatively coupled to both the first and second refresh outputs 214, 216, although in one example, the display memory re-mapper 208 may not be directly coupled to the refresh outputs 214, 216. Similar to the operating controller 100 above, the display controller 128 may include multiple display processors 200, multiple display memories 202, 210, 212 and a number of different types of I/O circuits. The display memories 202, 210, 212 may be implemented as random access memories (RAM) as indicated in FIG. 1, or as semiconductor memories, magnetically readable memories, and/or optically readable memories, for example.

The display processor 200 may be used to compute pixel data according to the image data, which may be directed from the microprocessor 104, thereby relieving the microprocessor 104 of having to compute the pixel data. As indicated above, the image data may include imaging instructions for creating pixel data and display mode instructions for displaying the pixel data (e.g., display mode, image transformation, etc.). The display processor 200 may read the image data for an image and generate pixel data accordingly, with the appropriate color and pixel address for each pixel. The display processor 200 may store the pixel data representing the image as an image array on the display memory 202. The display processor 200 may further cause the display re-mapper 208 to execute the display mode instructions to transform the pixel data to a desired mode, thereby transforming the image. It should be appreciated that although a graphics acceleration microprocessor 200 is described, a graphics coprocessor may also be used. Rather than receiving image data for an image from the microprocessor 104, graphics driver software may direct imaging tasks directly to the graphics coprocessor for processing.

The display memory 202 receives the pixel data from the display processor 200 and stores the pixel data as an image array. In some cases, the display memory 202 may receive the pixel data from the microprocessor 104 of the operating controller 100 or from the system BIOS, which may be the case if the pixel data has already been determined and forwarded to the display memory 202 (e.g. by the system BIOS at startup). The arrangement of the image array may be determined by the pixel addresses of each pixel image. Each pixel address may be represented by an x-axis and a y-axis, the values of which may depend on the pixel image's placement within the image (e.g., (1, 1) may represent the pixel image at the top, leftmost corner of the image). Other forms of storing the pixel data may also be used. As explained further below, the image array may store the pixel data as if it were to be displayed on a single display unit. In one example, the display controller 128a may operate without the display memory 202, and the display memory re-mapper 208 may be operatively coupled to the display processor 200 and the display I/O circuit 204 without the intervening display memory 202.

If provided with the display memory 202, the display memory re-mapper 208 continuously reads pixel data from the display memory 202 and transforms the pixel data into a desired graphics output. If provided without the display memory 202, the display memory re-mapper 208 accepts the pixel data intended for the display memory 202 directly from the display processor 200, operating controller 100 (e.g., microprocessor 104, the operating system, the system BIOS, etc) and/or the dynamic buttons 22, and apportions the pixel data onto the display units 12, 14. The transformation may be dictated by the display processor 200 based on the display mode instructions. Display mode instructions may also be received from the controller 100. Alternatively, the display memory re-mapper 208 may include processing capabilities to receive and execute the display mode instructions. For example, the display mode instructions may take the form of a request to display the right half of an image on the right display unit 14 and invert the image along a vertical axis. The display re-mapper 208 may interpret and execute these instructions by re-mapping the appropriate pixel data without further instruction from the display processor 200 or the operating controller 100.

Figure 3A:
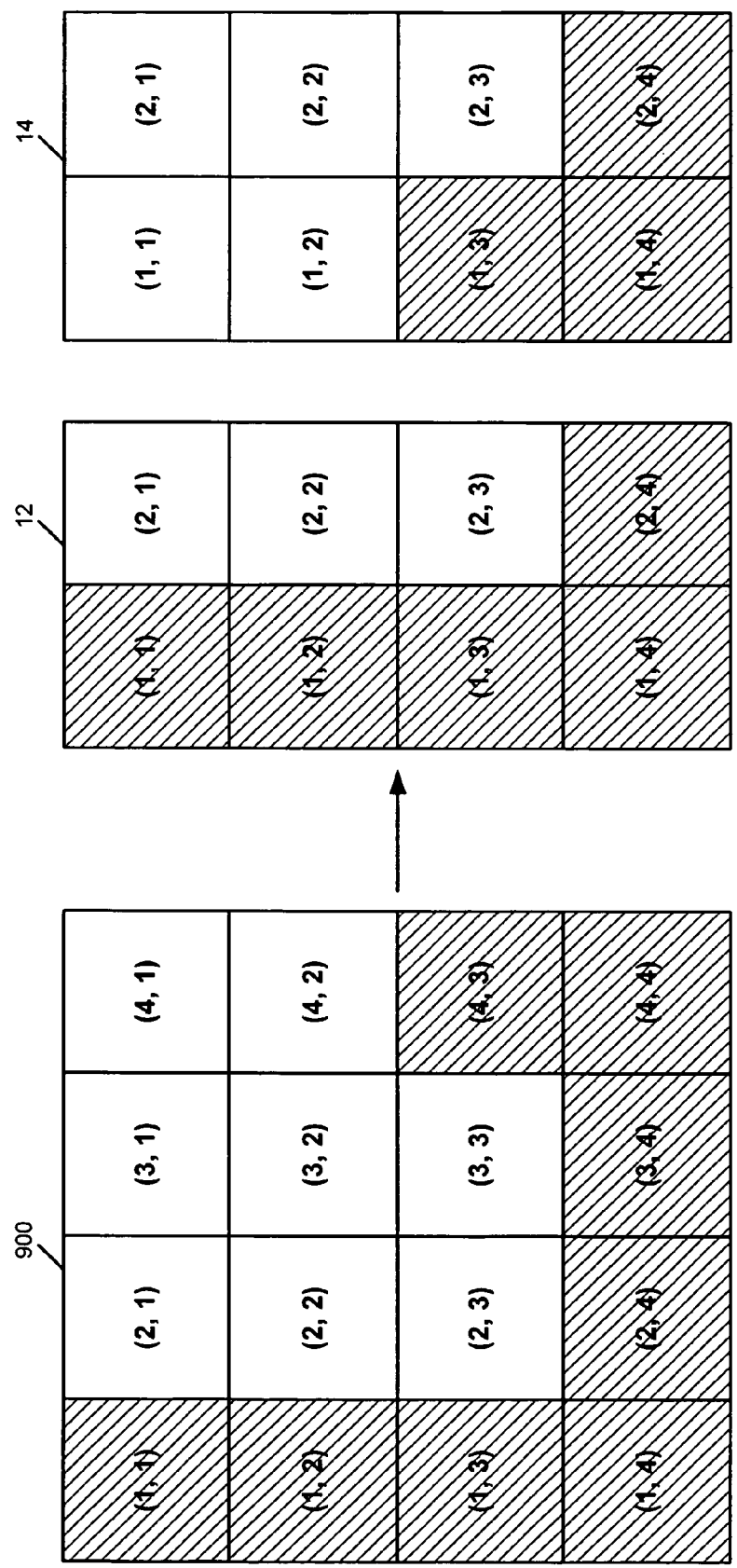
FIG. 3A is an illustrative example of how pixel data may be transformed or altered.

FIG. 3A is an illustrative example of the display re-mapper 208 transforming or altering a 4×4 pixel image 900 to be independently displayed on the display units 12, 14. Although the image 900 is shown as a 4×4 pixel array and the display units 12, 14 are shown as 2×4 pixel resolution display units, this example is merely to provide a simple explanation of the re-mapping process, and an actual image resolution and display resolution may comprise a much larger array with pixels numbering in the thousands, millions or more. As shown in FIG. 3A, each pixel image has a pixel address (x, y) and color (represented as either white or diagonal lines for purposes of explanation), which are together representative of the overall image 900. The pixel address identifies where a particular pixel image is to be displayed on a display screen, and the image array may store this pixel data in the display memory 202 as if the image 900 were to be displayed on a single 4×4 display unit. For example, a pixel image with address (3, 4) would normally be displayed at a pixel located at column 3, row 4 of the 4×4 pixel array of a display unit. The display re-mapper 208 may re-map (e.g., re-position) each pixel image by re-writing or altering the pixel address of each pixel image, thereby transforming the image according to the display mode instructions. For example, as shown in FIG. 3A, the image 900 is to be evenly displayed among the display units 12, 14 as dictated by the display mode instructions. The display mode instructions may further instruct the display controller 128a to invert the image on the right display unit 14 along a vertical axis. To accomplish this, the display re-mapper 208 may re-map the pixel image at address (3, 1) of the image 900 to address (2, 1) on the right display unit 14. Likewise, the pixel image at (3,2) may be re-mapped to (2,2), the pixel image at (3, 3) to (2, 3), the pixel image at (3,4) to (2,4), the pixel image (4,1) to (1,1), etc. The left side of the image 900 may be mapped to the left display unit 12 in a similar manner, although the image is not inverted.

The transformed pixel data is written by the display memory re-mapper 208 to the first and second output display memories 210, 212 according to the image to be displayed on the first and second display units 12, 14, respectively. For example, if image data relating to a particular image(s) is received by the display controller 128a, the display re-mapper 208 may apportion the transformed pixel data by writing the appropriate pixel data sets to each output display memory 210, 212 depending on which portions of the image are to be displayed on a particular display unit 12, 14. The transformed pixel data may be stored in the output memories 210, 212 as image arrays arranged according to the pixel address of the transformed pixel data. The image data may relate to a single image to be apportioned among the display units 12, 14, or the image data may relate to multiple images, with a partial or whole image(s) displayed on each display unit 12, 14. The decision of which image or image portion to display on which display unit may be determined by the display mode instructions. The display mode instructions may further dictate additional transformations to be performed on the image portion of each display unit 12, 14 (e.g., inversion, magnification, color modification, image blurring, etc.)

The first and second output display memories 210, 212 receive and store the transformed pixel data from the display memory re-mapper 208. The transformed pixel data may be stored in an image array for each display unit 12, 14 according to the transformed pixel addresses. Pixel data to be displayed on the first display unit 12 is received and stored by the first output display memory 210, and pixel data to be displayed on the second display unit 12 is received and stored by the second output display memory 212. The first refresh output 214 may continually read the first output display memory 210 for new transformed pixel data to be displayed on the first display unit 12. Likewise, the second refresh output 216 may continually read the second output display memory 212 for new transformed pixel data to be displayed on the second display unit 14. That is, when a previous image being displayed on a display unit 12, 14 is to be refreshed (i.e., updated with a new image or modified version of the previous image), the respective refresh output 214, 216 may read the transformed pixel data from the output display memories 210, 212 and feed the transformed pixel data to the display units 12, 14 as scan data. Because each display unit 12, 14 may be provided with a separate refresh output 214, 216 and separate output display memories 210, 212, the pixel data for one display unit may be controlled independently of the pixel data for the other display unit. However, this may be done using the same image data, the same display processor 200, the same display memory re-mapper 208 and the same I/O circuit 204. In effect, the display controller 128a is able to transform the images displayed on each display unit 12, 14 concurrently and independently of each other, which may relieve the operating controller 100 of having to compute image data for two display units and negate modifications to the operating system to accommodate multiple display units.

The scan data may be fed line by line, which may be an interlaced scan or a progressive scan depending on the particular type of display units 12, 14 being used. With video display, the refresh rate can be approximately 60 Hz or 30 frames per second, although the refresh rate may be faster or slower depending on the image source. For example, S-video has a faster refresh rate than standard NTSC video, whereas some images are only updated or changed if there is new data to be displayed. If the display memory re-mapper 208 is coupled to each refresh output 214, 216, as shown in FIG. 3, the display memory re-mapper 208 may control the sweep mode of the refresh outputs 214, 216 to provide variable scan modes. For example, the display memory re-mapper 208 may cause the scan data to be sent to the display units 12, 14 in various sweep modes (e.g., by pixel row, by pixel column, by reverse pixel row, by reverse pixel column, etc.). Because there are separate refresh outputs 214, 216 for each display unit 12, 14, the scan data for one display unit may be controlled independently of the scan data for the other display unit. In addition, by controlling the scan modes, the display controller 128a may change the display orientation of an image without transforming the pixel data, though transformation may be used in conjunction for other image manipulation. For example, if an image is to be rotated clockwise 90 degrees, the scan mode may be adjusted according to the display mode instructions to begin the scan (and hence display of pixel data) at the top rightmost pixel and display each pixel on a column-by-column basis. Thus, what would normally be the first row of pixel images of the overall image is displayed in the rightmost column, the second row in the second rightmost column, etc., such that the overall image is oriented 90 degrees clockwise. With separate control over each refresh output 214, 216, the scan mode of one display unit 12 may be controlled independently of the scan mode for another display unit 14.

Figure 4:
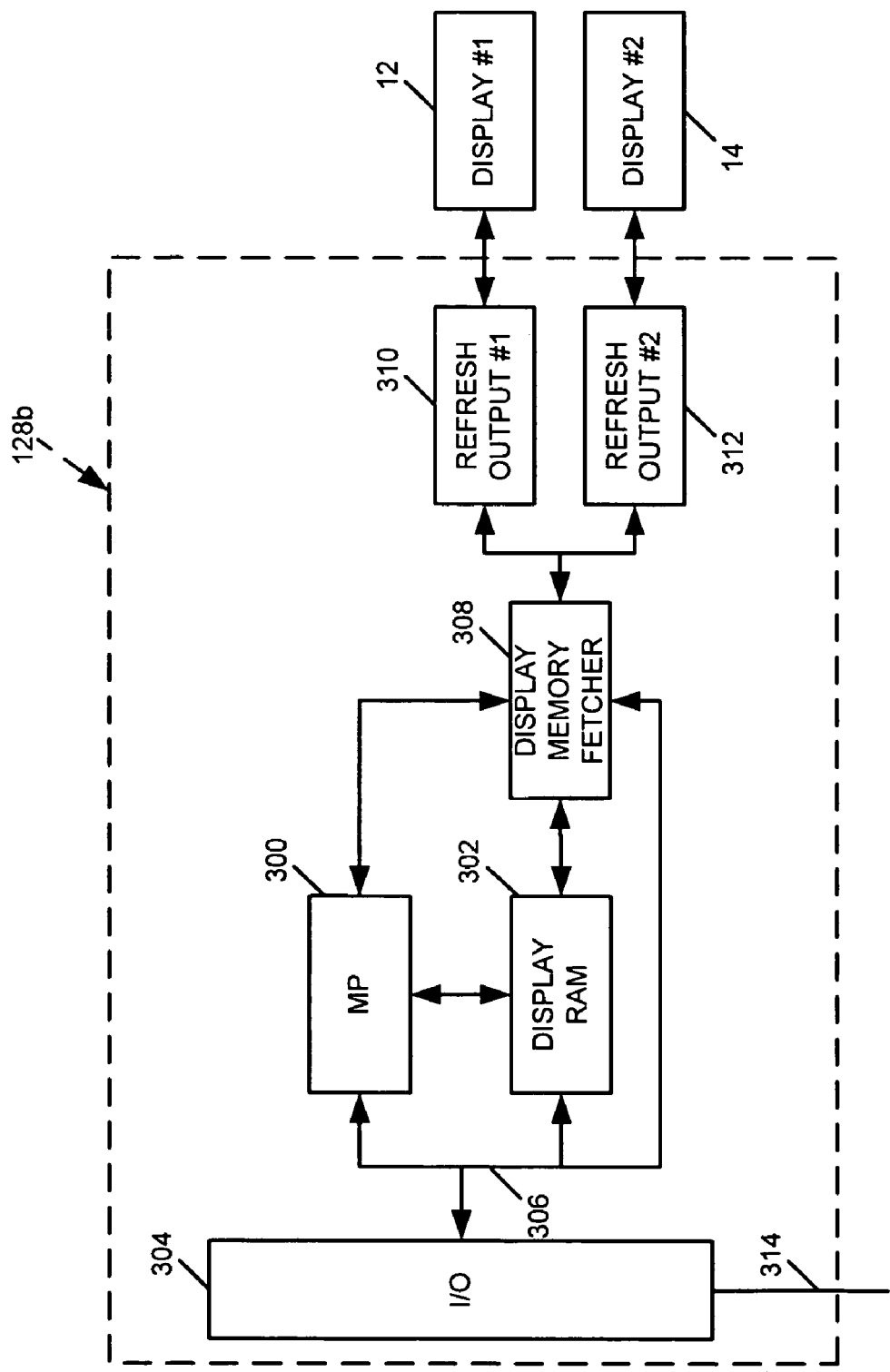
FIG. 4 is a block diagram of an alternative example of a display controller of the computer display apparatus.

FIG. 4 is a block diagram of another example of a display controller 128*b* that may be used with the computer display apparatus 10. Referring to FIG. 4, display controller 128*b* may comprise a display processor 300, a display memory 302 and a display I/O circuit 304, all of which may be operatively intercoupled via an address/data bus 306. The display processor 300, display memory 302, display I/O circuit 304 and data bus 306 may be similar to those described above for the display controller 128*a*. A display memory fetcher 308 is operatively coupled to the display memory 302, with first and second refresh outputs 310, 312 operatively coupled to display memory fetcher 308. The first and second display units 12, 14 are, in turn, operatively coupled to the first and second refresh outputs 310, 312, respectively. The display memory fetcher 308 may further be coupled to the I/O circuit via bus 306 to receive display mode instructions from the operating controller 100. The display memory fetcher 308 may also be coupled to the display processor 300 to receive display mode instructions.

As with the display controller 128*a* described above, the display processor 300 may create pixel data according to imaging instructions received from the operating controller 100 or another source. The display memory 302 may receive the pixel data from the display processor 300 (or other sources, as described above) and store the image data as a pixel array. Pixel data may also be received from the microprocessor 104 and/or system BIOS. The display I/O circuit 304 may perform all communications with the operating controller 100 via a data link 314.

The display memory fetcher 308 selectively retrieves pixel data from the display memory 302 in response to a request from a refresh output, and provides the pixel data to the requesting refresh output. The display fetcher 308 may remain in a wait state waiting for a pixel data or a display line data request from each refresh output 310, 312. The pixel data or display line data request may include a request for a pixel image(s) corresponding to a given pixel display address(es) on a display unit 12, 14. When pixel or display line data is requested by a refresh output 310, 312, the display memory fetcher 308 selectively retrieves pixel data from the display memory 308. Prior to retrieving pixel data from the display memory 308, the requested pixel or display line data may be transformed by the display memory fetcher 308 according to the desired display mode. For example, referring again to FIG. 3A, the display mode of the display unit 14 may display the right half of the image 900 inverted along a vertical axis. When the refresh output 312 requests pixels (1,1) and (2,1) for the display unit 14, the display memory fetcher 308 may retrieve pixels (4,1) and (3,1) from the image 900 and present them to refresh output 312 as pixels (1,1) and (2,1) respectively. The determination of which pixels to retrieve for the image 900 is determined by transforming the data request from the refresh output 312 according to the current display mode setting of display 14.

The display mode(s) employed by the display memory fetcher 308 may be directed by the display processor 300, by user input via the dynamic buttons 22, or by the operating system. Each refresh output 310, 312 may continually request and receive transformed pixel data from display memory fetcher 308, and feed the transformed pixel data line by line to the respective display unit 12, 14 as scan data. The display units 12, 14, in turn, display the scan data received from the respective refresh output 310, 312 as a visual image. The transformation of the pixel data based on pixel address permits selective image fetching and transformation. Similar to the display controller 128*a* above, the same display controller 128*b* in the instant example provides independently controllable images on different display units 12, 14 and relieves the operating controller 100 of having to process image data for multiple display units 12, 14.

Figure 5:
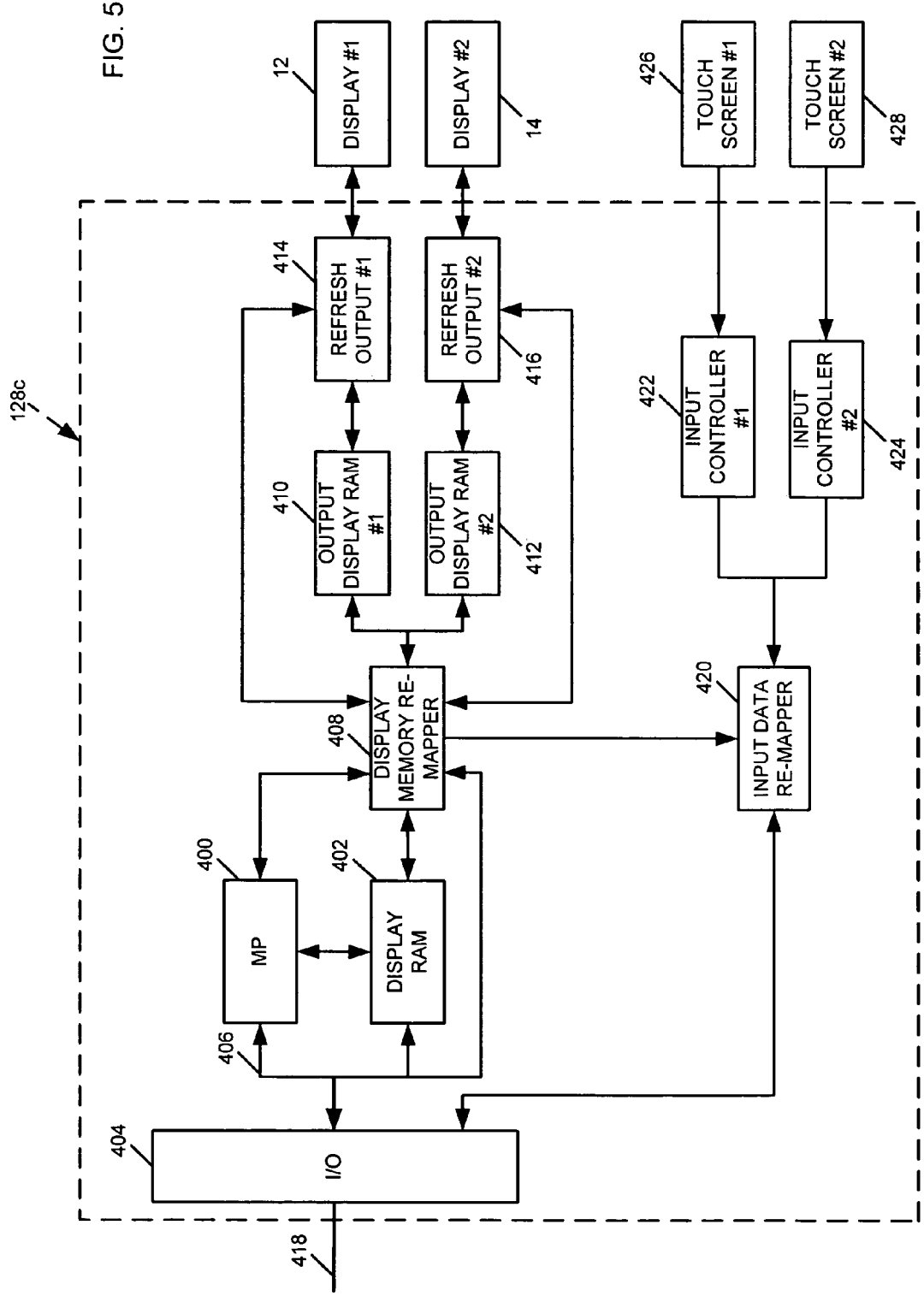
FIG. 5 is a block diagram of another alternative example of a display controller of the computer display apparatus.

FIG. 5 is a block diagram of a further example of a display controller 128*c* that may be used with the computer display apparatus 10. Referring to FIG. 5, display controller 128*c* may comprise a display processor 400, a display memory 402 and a display I/O circuit 404, all of which may be operatively intercoupled via an address/data bus 406. A display memory re-mapper 408 is operatively coupled to the display memory 402, with first and second output display memories 410, 412 operatively coupled to the display memory re-mapper 408. The display memory re-mapper 408 may further be coupled to the I/O circuit 404 via the bus 406 and coupled to the display processor 400. First and second refresh outputs 414, 416 are operatively coupled to output display memories 410, 412, respectively. The first and second display units 12, 14 are, in turn, operatively coupled to the first and second refresh outputs 414, 416, respectively. The display processor 400, display memories 402, 410, 412, display I/O circuit 404, data bus 406, display memory re-mapper 408 and refresh outputs 414, 416 may be similar to those described above for the display controller 128*a* of FIG. 3. Although shown as directly and operatively coupled to the refresh outputs 414, 416 to control the scan data, the display memory re-mapper 408 may not be directly coupled to the refresh outputs 414, 416. Further, the display memory re-mapper 408 may be operatively coupled to the display processor 400 and the display I/O circuit 404 without the intervening display RAM 402 to receive pixel data and display mode instructions directly from the display processor 400, the operating controller 100 (e.g., the microprocessor 104, the operating system, the system BIOS, etc.) and/or from the dynamic buttons 22.

As with the display controller 128*a*, described above, the display processor 400 may create pixel data according to imaging instructions received from the operating controller 100 or another source. The display memory 402 may receive the pixel data from the display processor 400 and store the pixel data as an image array. The display I/O circuit 404 may perform all communications with the operating controller 100 via a data link 418. The display processor 400 may be operatively coupled to the display I/O circuit 404 to receive display mode instructions. The display memory re-mapper 408 may further be coupled to the I/O circuit 404 via bus 406 to allow the display memory re-mapper 408 to also receive display mode instructions from the operating controller 100 (e.g. the microprocessor 104, the operating system, the system BIOS, etc.) or from the dynamic buttons 22. The display memory re-mapper 408 may also be coupled to the display processor 400 to receive display mode instructions. If provided with the display memory 402, the display memory re-mapper 408 continuously reads pixel data from the display memory 402 and transforms the pixel data according to a desired display mode.

The transformed pixel data is written by the display memory re-mapper 408 to the first and second output display memories 410, 412 according to the image to be displayed on the first and second display units 12, 14, as described above. Pixel data to be displayed on the first display unit 12 is received and stored by the first output display memory 410, and pixel data to be displayed on the second display unit 14 is received and stored by the second output display memory 412. The first refresh output 414 continually reads the first output display memory 410 for new transformed pixel data to be displayed on the first display unit 12, and the second refresh output 416 continually reads the second output display memory 412 for new transformed pixel data to be displayed on the second display unit 14. The transformed pixel data may be fed to the display units 12, 14 line-by-line as scan data. If the display memory re-mapper 408 is coupled to each refresh output 414, 416, the display memory re-mapper 408 may control the sweep mode of the refresh outputs 414, 416 to provide variable scan modes which may alter the image's orientation without transforming the pixel data, though the transformation may still be used for other image manipulations.

The display controller 128c, as shown in FIG. 5, further includes an input data re-mapper 420 operatively coupled to the display memory re-mapper 408 and the display I/O circuit 404, and a first and second input controller 422, 424 operatively coupled to the input data re-mapper 420. First and second touch screens 426, 428 may be operatively coupled to the first and second input controllers 422, 424, respectively. The first and second touch screen 426, 428 may be incorporated in the first and second display units 12, 14 respectively, or may be provided as separate display units. Each touch screen 426, 428 may receive input by sensing pressure or contact applied to the screen in particular areas, which may correspond to different selectable options displayed to a user. The touch screens 426, 428 send positional data to their respective input controllers 422, 424 indicating where the pressure or contact was sensed on the screen. The input controllers 422, 424 receive the positional data from the respective touch screens 426, 428 and forward the positional data to the input data re-mapper 420. The input data re-mapper 420 receives the data from the input controllers 422, 424 and transforms the positional data according to the display mode of the touch screens 426, 428. The transformation adjusts the positional data to account for the display mode of the touch screens 426, 428 (or associated display unit 12, 14). In other words, the input data re-mapper 420 may transform the positioned data in reverse to the transformation performed by the display memory re-mapper 408.

For example, referring again to FIG. 3A, the input data re-mapper may receive positional data corresponding to the pixel at pixel address (2, 2) of the right display unit 14. As indicated above, the touch screen 428 may be incorporated in the right display unit 14, so pressure sensed at the pixel address (2, 2) may correspond to the user selecting an option represented by an image displayed at pixel address (2, 2). As mentioned above with reference to FIG. 3A, the image 900 was displayed evenly on the display units 12, 14, with the image portion on the right display unit 14 inverted along a vertical axis. In particular, the pixel image at pixel address (3, 2) of the image 900 was re-mapped to pixel address (2, 2) of the image on the right display unit 14. Based on this initial transformation performed by the display memory re-mapper 408 and communicated to the display units 12, 14, positional data received by the input data re-mapper 420 may re-map the positional data from pixel address (2, 2) of the image on the right display unit 14 to pixel address (3, 2) of the image 900, thereby indicating where the pressure was sensed with respect to the original image 900. The display mode instructions may be shared with the input data re-mapper 420 to help facilitate the re-mapping of the positional data or otherwise interpreted to provide the input data re-mapper 420 with appropriate re-mapping instructions. The transformed positional data may be communicated to the I/O circuit 404. Positional data may correspond to pressure sensed at multiple pixel addresses at approximately the same time (e.g., the imprint of a selection may comprise multiple pixel addresses because pressure may be applied to those multiple pixel addresses simultaneously), and that the principles of the present example may be applied to positional data received from multiple pixel addresses.

The transformed positional data may be sent via the display I/O circuit 404 to the display processor 400 and/or the operating controller 100 to relay instructions and/or responses as indicated by the positional data. For example, the positional data may indicate a selection made by a user, which may be a response to a query by the display controller 128c, the operating controller 100, an application being executed by the operating controller 100, etc. The user's selection may also indicate an instruction that causes the display controller 128c, operating controller 100, application, etc. to perform a desired function. The operating controller 100, operating system, etc. may be relieved of not only computing image data for multiple display units 12, 14, but may also be relieved of computing positional data from multiple touch screens 426, 428. In other words, many of the components of the multiple display units 12, 14 and touch screens 426, 428 may be blind to the display apparatus 10, thereby allowing them to send and receive image data and/or positional data as if there were only one display unit or touch screen.

Figure 6:
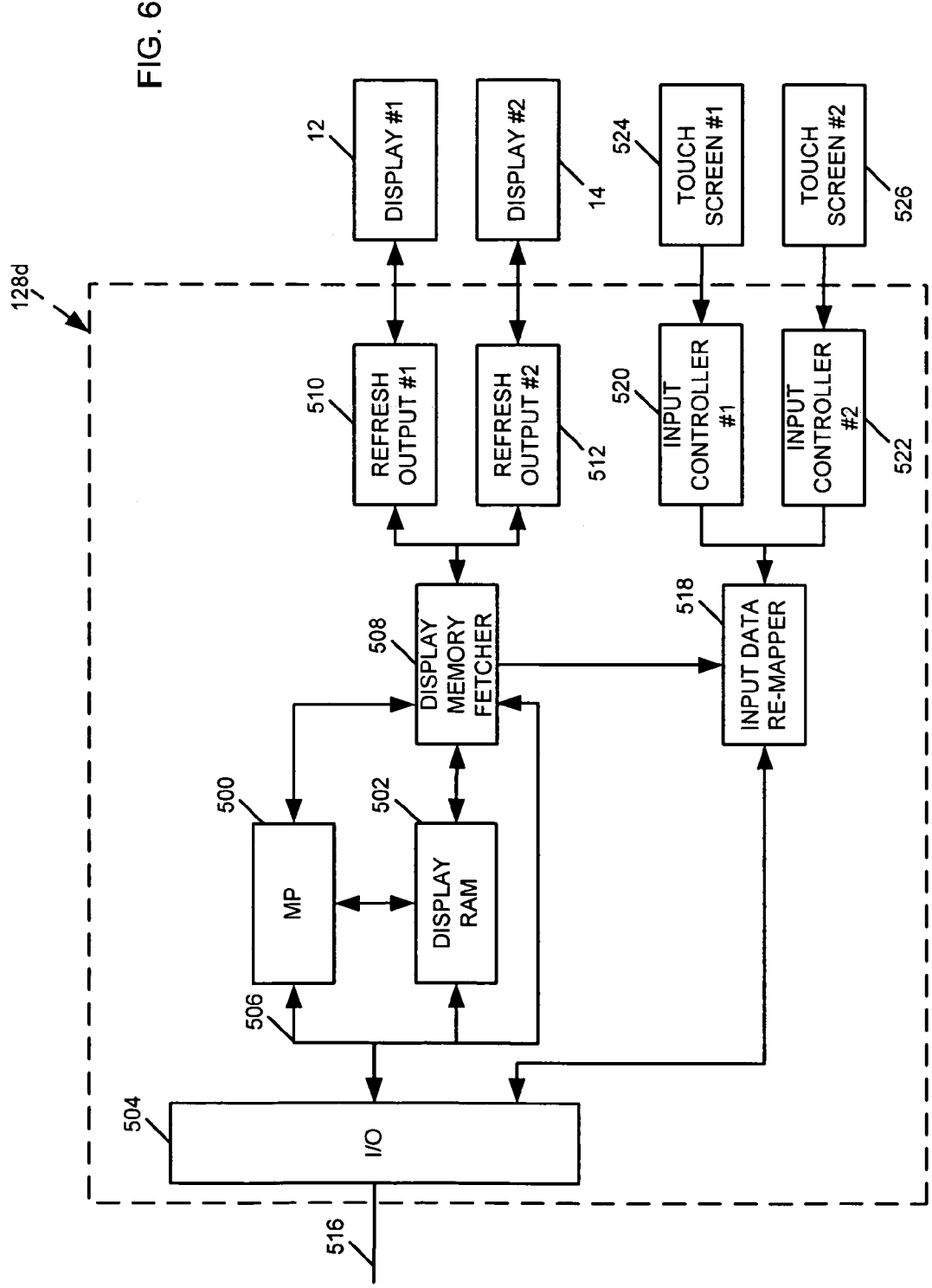
FIG. 6 is a block diagram of yet another alternative example of a display controller of the computer display apparatus.

FIG. 6 is a block diagram of yet another example of a display controller 128d that may be used with the computer display apparatus 10. Referring to FIG. 6, the display controller 128d may comprise a display processor 500, a display memory 502 and a display I/O circuit 504, all of which may be operatively intercoupled via an address/data bus 506. A display memory fetcher 508 is operatively coupled to the display memory 502, with first and second refresh outputs 510, 512 operatively coupled to display memory fetcher 508. The first and second display units 12, 14 are, in turn, operatively coupled to the first and second refresh outputs 510, 512, respectively. The display memory fetcher 508 may further be coupled to the I/O circuit 504 via the bus 506 and coupled to the display processor 500. The display processor 500, display RAM 502, display I/O circuit 504, data bus 506, display memory fetcher 508 and refresh outputs 510, 512 may be similar to those described above for the display controller 128b in FIG. 4.

The display controller 128d, as shown in FIG. 6, further includes an input data re-mapper 518 operatively coupled to the display memory fetcher 508 and the display I/O circuit 504, and a first and second input controller 520, 522 operatively coupled to the input data re-mapper 518. First and second touch screens 524, 526 may be operatively coupled to the first and second input controllers 520, 522, respectively. The input data re-mapper 518, input controllers 520, 522 and touch screen 524, 526 may be similar to those described above in FIG. 5. For example, the first and second touch screen 524, 526 may be incorporated in the first and second display units 12, 14 respectively, or provided as separate display units. Each touch screen 524, 526 may receive input by sensing pressure or contact applied to the screen in particular areas, and sending positional data to their respective input controllers 520, 522. The input controllers 520, 522 forward the positional data to the input data re-mapper 518. The input data re-mapper 518 transforms the positional data according to the display mode of the touch screens 524, 526, similar to the transformation described above for the display controller 128c of FIG. 5. The transformation adjusts the positional data to account for the display mode of the touch screens 524, 526 (or associated display unit 12, 14). The transformed positional data may relay instructions and/or responses as indicated by the positional data.

Figure 7:
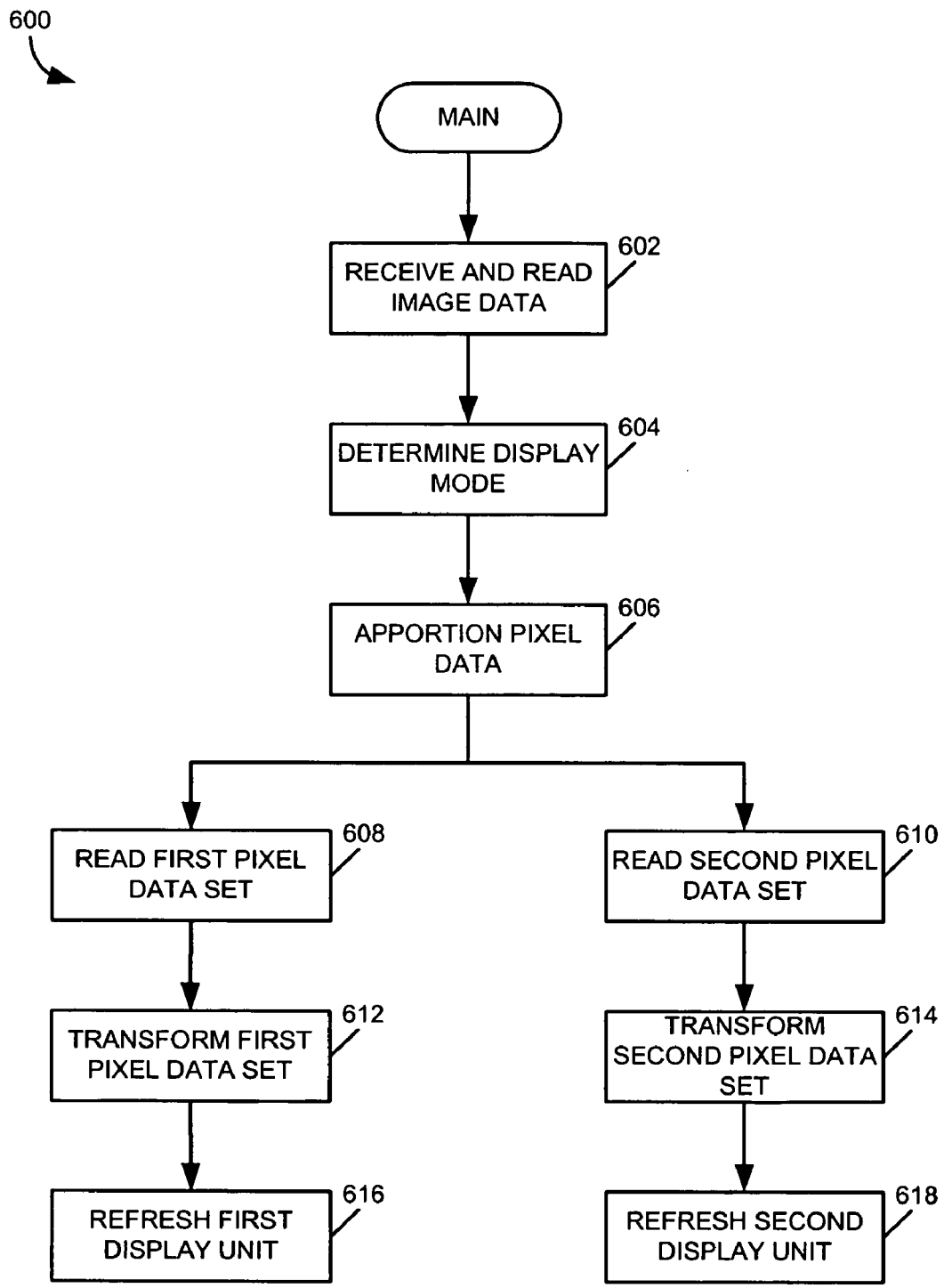
FIG. 7 is a flowchart of an example of a main display routine that may be performed during operation of the computer display apparatus.

FIG. 7 is a flowchart of a main display routine 600 that may be stored in the memory of the display controller 128. The display routine 600 described herein may be varied depending on the particular implementation of the display controller 128. Beginning at block 602, the display controller 128 receives and reads image data. As mentioned above, the image data may contain display mode instructions for transforming an image, in addition to the imaging instructions for creating pixel data. However, the image data may comprise just display mode instructions for transforming an existing image being displayed, whereby existing pixel data is copied and transformed according to the new display mode instructions. The image data may comprise a single image to be displayed on one or both of the display units 12, 14 or multiple images, where each image is displayed on its own display unit 12, 14. The image data may also relate to static images or video images. Upon receiving the image data, the display controller 128 may create pixel data in accordance with the imaging instructions.

Based on the display mode instructions, a particular display mode is determined at block 604. Examples of the display modes are described in further detail below. Once a display mode has been determined, the routine 600 may apportion the pixel data as needed among the display units 12, 14 at block 606. Pixel data for the first display unit 12 may be separated out from the pixel data for the second display unit 14. The pixel data portions (or sets) may be based on the display mode determined at block 604. In some instances, a pixel data set may exist for one display unit but not the other, resulting in an image displayed on one display unit with no image displayed on the other display unit. In other instances, the apportionment at block 606 may result in the same image being displayed with the same display mode instructions by all display units 12, 14. In effect, the apportionment process may copy the pixel data for each display unit 12, 14. In still other instances, the apportionment process may result in the same image being displayed by all display units using different display mode instructions (e.g., different orientation, quality, enlargement, etc.). The apportionment process may involve designating the pixel data sets and associating those sets with a particular display unit without further transformation.

Once the pixel data has been apportioned among the display units 12, 14 into multiple pixel data sets, the pixel data sets may be read at block 608 and block 610 for the display units 12, 14 respectively. Each pixel data set may be associated with display mode instructions to indicate further transformations that may be performed on each pixel data set. One pixel data set may thereby be transformed independently of the other pixel data set. Based on the display mode instructions with the first pixel data set, the display routine 600 may cause the display controller 128 to transform the image of the first pixel data set according to the associated display mode instructions at block 612. Likewise, the display routine 600 may cause the display controller 128 to transform the image of the second pixel data portion according to the associated display mode instructions at block 614. Scan mode alterations may likewise be performed at blocks 612 and 614. Once each pixel data set has been transformed, the corresponding display units 12, 14 may each be refreshed with the images at blocks 616 and 618. However, the transformation process for each image to be displayed on the display units may be performed before or as part of the apportionment process at block 606. For example, the transformation of the pixel data before apportionment may take into account the differences between how the image is displayed on the left display unit 12 verses how the image is displayed on the right display unit 14 (e.g. inverted on one but not the other, etc.). The transformed pixel data may then be apportioned accordingly.

FIGS. 8 and 15 are examples of images that may be displayed on the computer display apparatus 10 in various display modes as shown in the examples of FIGS. 9-14 and 16-19 using the methods and apparatus described above. However, the display modes of FIGS. 9-14 and 16-19 are by no means intended to limit the possible display modes in which an image may be displayed on the computer display apparatus 10.

FIG. 8 is representative of an image 700 that may be represented as imaging instructions received by the display controller 128. As referred to above, the display controller 128 may receive display mode instructions for displaying the image in various display modes on the display units 12, 14. For example, the display mode instructions may cause the display controller 128 to display a single image 700 in multiple display modes on the display units 12, 14, where an image displayed on the display unit 12 is displayed independently of an image on the display unit 14, as shown in FIGS. 9-14. Additionally, an image displayed on one display unit may be transformed independently of the image on the other display unit. For example, FIG. 11 may be the result of the display controller 128 changing the image on the left display unit 12 (as compared to FIG. 9) independently of the image on the right display unit 14.

FIG. 9 is an example of how the image 700 may be displayed on the display units 12, 14 as horizontally continuous images, with the left portion of the image 700 displayed on the left display unit 12 and the remaining right portion of the image 700 displayed on the right display unit 14. The orientation of the image 700 in FIG. 9 is commonly referred to as a "portrait orientation" (i.e., a display mode in which the image content is oriented for viewing across the width of the screen).

FIG. 10 is an example of how the image 700 may be displayed on the display units 12, 14 as vertically continuous images in a portrait orientation, with an upper portion of the image 700 displayed on the left display unit 12 and a lower portion of the image 700 continuing from the upper portion displayed on the right display unit 14.

FIG. 11 is an example of how the same portion of the image 700 may be displayed on the display units 12, 14 in a portrait orientation, though the image on the right display unit 14 has been inverted.

FIG. 12 is an example of how the image 700 may be displayed on the display units 12, 14 as vertically continuous images, with an upper portion of the image 700 displayed on the right display unit 14 and the remaining lower portion of the image 700 displayed on the left display unit 12. The orientation of the image 700 in FIG. 9 is commonly referred to as a "landscape orientation" (i.e., a display mode in which the image content is oriented for viewing across the height of the screen).

FIG. 13 is an example of how the image 700 may be displayed on the display units 12, 14 as horizontally continuous images in a landscape orientation, with a left portion of the image 700 displayed on the right display unit 14 and a right portion of the image 700 continuing from the left portion displayed on the left display unit 12.

FIG. 14 is an example of how the same portion of the image 700 may be displayed on the display units 12, 14 in a landscape orientation, though the image on the right display unit 14 has been inverted with respect to the image on the left display unit 12.

FIG. 15 is representative of an image 800 that may be represented as imaging instructions received by the display controller 128. The imaging instructions may also include the image 700. The display controller 128 may receive display mode instructions for independently displaying both images 700, 800 in various display modes on the display units 12, 14, as shown in FIGS. 16-19. The image of one display unit may be transformed independently of the image of the other display unit. For example, FIG. 17 may be the result of the display controller 128 changing the image on the left display unit 12 (as compared to FIG. 16) independently of the image on the right display unit 14, and FIG. 19 may be the result of the display controller 128 inverting the image 800 on the right display unit 14 (as compared to FIG. 18) independently of the image on the left display unit 12.

FIG. 16 is an example of how a left portion of the image 700 is displayed on the left display unit 12 in a portrait orientation and the left portion of the image 800 is displayed on the right display unit 14 also in a portrait orientation.

FIG. 17 is an example of how a left portion of the image 700 is displayed on the left display unit 12 in an inverted portrait orientation, whereas a left portion of the image 800 is displayed on the right display unit 14 in a non-inverted portrait orientation.

FIG. 18 is an example of how an upper portion of the image 700 is displayed on the left display unit 12 in a landscape orientation and an upper portion of the image 800 is displayed on the right display unit 14 also in a landscape orientation.

FIG. 19 is an example of how an upper portion of the image 700 is displayed on the left display unit 12 in a landscape orientation, whereas an upper portion of the image 800 is displayed on the right display unit 14 in an inverted landscape orientation.

Based on the above description, those of ordinary skill in the art will recognize that some or all aspects of the computer display apparatus 10 may be incorporated in various implementations. Among the possible implementations are: a computer book, a collaboration display device, a presentation display device and a public access display device.

A computer book may be developed based on the above description. A computer book may comprise a general purpose computer which has the look and feel of a book. The device may be lightweight and portable, comparable to a book. The computer book may execute commonly used operating systems and applications, including word processor applications, video playback applications, internet browsers, etc. The computer book may include the connections and interfaces described above with respect to FIG. 1. Using a sensor associated with the hinge 16 or articulated joint, the display controller 128 may automatically deactivate one of the display units 12, 14 if the computer book is opened such that the display units 12, 14 are positioned back-to-back, based on the assumption that, like a book, a user will only be viewing one side. The sensor may also detect other viewing angles and may cause the display controller to automatically adjust the contrast or brightness accordingly to optimize the images. Anti-aliasing may also be incorporated and applied as necessary.

A collaboration display device may likewise be developed based on the above description. A collaboration display device may allow people sitting around the device to view images in various orientations. For example, the display units 12, 14 may be positioned approximately back-to-back and the display controller 128 may detect this angle and cause the same image to be displayed on both display units 12, 14, though the images are inverted with respect to each other as in FIG. 14. This allows a user on one side of the device to view the same image as a user on the other side of the device. The display controller may also allow one user to view one image while the other user views another image, similar to FIG. 19. Similarly, a presentation device may display the same image on both display units 12, 14, but in a different orientation. If used solely as a presentation device, this may be a default or unalterable display mode of the images.

Further, a public access display device may be developed based on the above description. A public access display device may comprise two display units (preferably flat-panel displays) located on opposite sides of a housing so that one display may be seen by a user and the other may be easily seen by the public. The public access display device has the look and feel of a standard monitor from the perspective of the first user, who may have the ability to control the images viewed by the public. The image on the second display may be displayed in various displays modes. For example, in one mode the public can see and understand graphical images, but cannot easily read the text.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A computer display apparatus comprising:
a first display unit;
a second display unit articulately coupled to the first display unit; and
a display controller operatively coupled to the first and second display units, the display controller comprising a display processor and a memory,
the display controller being programmed to receive data relating to imaging instructions for one or more images,
the display controller being programmed to receive data relating to display mode instructions for displaying the one or more images,
the display controller being programmed to cause the first display unit to generate a first image from the imaging instructions according to the display mode instructions,
the display controller being programmed to cause the second display unit to generate a second image from the imaging instructions according to the display mode instructions independent of the generation of the first image,
the display controller being programmed to create pixel data according to the imaging instructions for the one or more images,
the display controller being programmed to generate first and second pixel data sets from the pixel data,
the display controller being programmed to transform the pixel data of the first and second pixel data sets according to the display mode instructions,
the display controller being programmed to cause the first display unit to generate the first image from the first transformed pixel data set according to the display mode instructions, and the display controller being programmed to cause the second display unit to generate the second image from the second transformed pixel data set according to the display mode instructions independent of the generation of the first image.

2. A computer display apparatus as claimed in claim 1, wherein the pixel data comprises pixel address data, and wherein the display mode instructions comprise instructions to alter one or more pixel addresses of the pixel data.

3. A computer display apparatus comprising:

a first display unit;

a second display unit articulately coupled to the first display unit;

a display controller operatively coupled to the first and second display units, the display controller comprising a display processor, a memory, a display memory re-mapper operatively coupled to the display processor and arranged to transform the pixel data according to the display mode instructions, a first refresh output operatively coupled to the display memory re-mapper and operatively coupled to the first display unit, the first refresh output arranged to read the first transformed pixel data set and to provide scan data relating to the first image to the first display unit, and a second refresh output operatively coupled to the display memory re-mapper and operatively coupled to the second display unit, the second refresh output arranged to read the second transformed pixel data set and to provide scan data relating to the second image to the second display; unit, the display controller being programmed to receive data relating to imaging instructions for one more images, the display controller being programmed to receive data relating to display mode instructions for displaying the one or more images, the display controller being programmed to cause the display unit to generate a first image from the imaging instructions according to the display mode instructions, the display controller being programmed to cause the second display unit to generate a second image from the imaging instructions according to the display mode instruction independent of the generation of the first image, and the display processor being programmed to create pixel data according to the imaging instructions.

4. A computer display apparatus as claimed in claim 3, wherein the display memory re-mapper is arranged to control a scan mode of the first refresh output according to the display mode instructions, wherein the display memory re-mapper is arranged to control a scan mode of the second refresh output according to the display mode instructions independent of scan mode of the first refresh output.

5. A computer display apparatus comprising:

a first display unit;

a second display unit articulately coupled to the first display unit; and a display controller operatively couple to the first and second display units, the display controller comprising a display processor, a memory, a first refresh output operatively coupled to the first display unit, the first refresh output arranged to provide a request for pixel data to the display memory fetcher, to receive transformed pixel data in response to the request, and to provide scan data relating to the first image to the first display unit, a second refresh output operatively coupled to the second display unit, the second refresh output arranged to provide a request for pixel data to the display memory fetcher, to receive the transformed pixel data in response to the request, and to provide scan data relating to the second image to the second display unit; and a display memory fetcher is operatively coupled to the first and second refresh outputs, and arranged to transform pixel data in response to a request for pixel data from the first refresh output and to transform pixel data in response to a request from the second refresh output independent of a request from the first refresh output, the display controller being programmed to receive data relating to imaging instructions for one or more images, the display controller being programmed to receive data relating to display mode instructions for display the one or more images, the display controller being programmed to cause the first display unit to generate a first image from the imaging instructions according to the display mode instructions, the display controller being programmed to cause the second display unit to generate a second image from the imaging instructions according to the display mode instructions independent of the generation of the first image, the display processor programmed to create pixel data according to the imaging instructions a display memory fetcher operatively coupled to the display processor.

6. A computer display apparatus a first display unit;

second display unit articulately coupled to the first display unit, wherein at least one of the first and second display units are touch sensitive; and a display controller operatively coupled to the first and second units, the display controller comprising a display processor, a memory, a first input controller operatively coupled to the first display unit and arranged to receive data relating to a position touched on the first display unit, a second input controller operatively coupled to the second display unit and arranged to receive data relating to a position touched on the second display unit, and an input data re-mapper operatively coupled to the first and second input controllers and arranged to transform the positional data from the first and second input controllers based on the display mode instructions, the display controller being programmed to receive data relating to imaging instructions for one or more images, the display controller being programmed to receive data relating to display mode instructions for displaying the one or more images, the display controller being programmed to cause the first display unit to generate a first image from the imaging instructions according to the display mode instructions, the display controller being programmed to cause the second display unit to generate a second image from the imaging instructions according to the display mode instructions independent of the generation of the first image.

7. A computer display apparatus comprising:
a first display unit;
a second display unit articulately coupled to the first display unit; and
a display controller operatively coupled to the first and second display units, the display controller comprising a display processor and a memory,
the display controller being programmed to receive to imaging instructions for one or more images,
the display controller being programmed to receive data relating to display mode instructions for displaying the one or more images,
the display controller being programmed to cause the first display unit to generate a first image from the imaging unit instructions according to the display mode instructions,
the display controller being programmed to cause the second display unit to generate a second image from the imaging instructions according to the display mode instructions independent of the generation of the first image, and
an operating controller operatively coupled to the display controller, the operating controller comprising a processor and a memory;
the operating controller being programmed to receive data relating to a computer operating system from a memory external to the computer display; and
the operating controller being programmed to execute the computer operating system according to instructions within the computer operating system data,
wherein the display controller is programmed to generate the first and second images independent of the operating controller.

8. A computer display apparatus comprising:
a first display unit;
a second display unit articulately coupled to the first display; and
a display controller operatively coupled to the first and second display units, the display controller comprising a display processor and memory,
the display controller being programmed to receive data relating to imaging instructions for one or more images,
the display controller being programmed to receive data relating to display mode instructions for displaying the one or more images,
the display controller being programmed to cause the first display unit to generate a first image from the imaging instructions according to the display mode instructions,
the display controller being programmed to cause the second display unit to generate a second image from the imaging instructions according to the display mode instructions independent of the generation of the first image, and
a housing arranged to house the display controller, the housing comprising a first housing portion arranged to house the first display unit, and a second housing portion articulately connected to the first housing portion and arranged to house the second display unit.

9. A display controller comprising:
a display processor programmed to generate pixel data according to imaging instructions;
a display re-mapper operatively coupled to the display processor and programmed to manipulate the pixel data according to display mode instructions;
a first and second refresh output operatively coupled to the display re-mapper, the first refresh output being programmed to generate an image display from at least part of the manipulated pixel data on a first display unit in a first display mode and the second refresh output being programmed to generate an image display from at least part of the manipulated pixel data on a second display unit in a second display mode,
wherein the image displayed on the first display unit is displayed in a display mode independent of the display mode of the image displayed on the second display unit.

10. A display controller as claimed in claim 9, wherein the display re-mapper is programmed to alter one or more pixel addresses of the pixel data according to the display mode instructions to create the manipulated pixel data.

11. A display controller as claimed in claim 9, wherein the display re-mapper is programmed to apportion the pixel data according to the display mode instructions into pixel data to be displayed on the first display unit and pixel data to be displayed on the second display unit.

12. A display controller as claimed in claim 9, wherein the display re-mapper is programmed to control a scan mode of the first refresh output and a scan mode of the second refresh output.

13. A display controller as claimed in claim 9 further comprising an input data re-mapper operatively coupled to a first touch-sensitive display unit and a second touch-sensitive display unit, the input data re-mapper programmed to manipulate the positional data received from first and second touch-sensitive display units based on the display mode instructions.

14. A display controller as claimed in claim 9, wherein the display mode instructions comprise instructions for displaying a first image on the first display unit and instructions for displaying a second image on the second display unit independent of the display mode of the first display unit.

15. A computer display apparatus comprising the display controller as claimed in claim 9, the first display unit and the second display unit, wherein the first and second display units are articulately coupled.

16. A display controller comprising:
a display processor programmed to generate pixel data according to imaging instructions;
a first and second refresh output, the first refresh output being programmed to request pixel data for a first display unit and a second refresh output being programmed to request pixel data for a second display unit;
a display memory fetcher operatively coupled to the display processor and the first and second refresh outputs, wherein the display memory fetcher is programmed to manipulate pixel data according to display mode instructions in response to a request for pixel data from at least one of the first and second refresh outputs,
wherein the requesting refresh output is programmed to generate an image display on a display unit from the manipulated pixel data in accordance with display mode instructions and an image displayed on the first display unit is displayed in a display mode independent of the display mode of the image displayed on the second display unit.

17. A display controller as claimed in claim 16, wherein the display memory fetcher is programmed to alter one or more pixel addresses of the pixel data according to the display mode instructions to create the manipulated pixel data.

18. A display controller as claimed in claim 16, further comprising an input data re-mapper operatively coupled to a first touch-sensitive display unit and a second touch-sensitive display unit, the input data re-mapper programmed to manipulate the positional data received from first and second touch-sensitive display units based on the display mode instructions.

19. A display controller as claimed in claim 16, wherein the display mode instructions comprise instructions for displaying a first image on the first display unit and instructions for displaying a second image on the second display unit independent of the display mode of the first display unit.

20. A computer display apparatus comprising the display controller as claimed in claim 16, the first display unit and the second display unit, wherein the first and second display units are articulately coupled.

* * * * *

UNITED STATES PATENT AND TRADEMARK OFFICE
CERTIFICATE OF CORRECTION

PATENT NO. : 7,289,084 B2
APPLICATION NO. : 11/063001
DATED : October 30, 2007
INVENTOR(S) : John M. Lesniak It is certified that error appears in the above-identified patent and that said Letters Patent is hereby corrected as shown below:

On the Title Page:

At item (74), "Marshall" should be -- Marshall, --.

At Column 19, line 29, "display;" should be -- display --.

At Column 19, line 60, "couple" should be -- coupled --.

At Column 20, line 7, "unit;" should be -- unit, --.

At Column 20, line 34, "apparatus" should be -- apparatus comprising: --.

Signed and Sealed this

Twenty-ninth Day of July, 2008

JON W. DUDAS
*Director of the United States Patent and Trademark Office*